(12) United States Patent
He et al.

(10) Patent No.: US 11,281,814 B2
(45) Date of Patent: Mar. 22, 2022

(54) SCREEN-ON METHOD AND RELATED APPARATUS

(71) Applicant: HUAWEI TECHNOLOGIES CO., LTD., Guangdong (CN)

(72) Inventors: Zhen He, Shenzhen (CN); Qinghao Jin, Shenzhen (CN); Ding Zhong, Dongguan (CN); Changliang Liao, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/118,189

(22) Filed: Dec. 10, 2020

(65) Prior Publication Data

US 2021/0089686 A1 Mar. 25, 2021

Related U.S. Application Data

(63) Continuation of application No. PCT/CN2019/122066, filed on Nov. 29, 2019.

(30) Foreign Application Priority Data

Dec. 24, 2018 (CN) .......................... 201811582459.1

(51) Int. Cl.
  *G06F 1/16* (2006.01)
  *G06F 21/84* (2013.01)
  *G09G 5/14* (2006.01)

(52) U.S. Cl.
  CPC ............ *G06F 21/84* (2013.01); *G06F 1/1641* (2013.01); *G09G 5/14* (2013.01); *G09G 2354/00* (2013.01); *G09G 2358/00* (2013.01)

(58) Field of Classification Search
None
See application file for complete search history.

(56) References Cited

U.S. PATENT DOCUMENTS 9,817,486 B2   11/2017  Kwak et al.
2016/0195938 A1*  7/2016  Kim ..................... H04B 1/3827
                                                                                345/156

(Continued)

FOREIGN PATENT DOCUMENTS

CN       104808923 A     7/2015
CN       106020667 A    10/2016

(Continued)

OTHER PUBLICATIONS

PCT International Search Report and Written Opinion issued in International Application No. PCT/CN2019/122066 dated Mar. 2, 2020, 11 pages (parital English translation).

(Continued)

*Primary Examiner* — Rinna Yi
(74) *Attorney, Agent, or Firm* — Fish & Richardson P.C.

(57) ABSTRACT

Screen-on methods and related apparatus are provided. In one aspect, a method, which can be performed by an electronic apparatus, includes: in a screen-off state, obtaining a first screen-on instruction, a screen of the electronic apparatus being divided into at least two screen areas by a bending axis; determining a first screen area based on at least one of rotation speeds or rotation accelerations at which the at least two screen areas rotate around the bending axis; and lighting up the first screen area according to the first screen-on instruction, and setting a second screen area other than the first screen area to be in the screen-off state.

16 Claims, 14 Drawing Sheets

(56) References Cited

U.S. PATENT DOCUMENTS

| | | | |
|---|---|---|---|
| 2016/0349857 A1 | 12/2016 | Xu | |
| 2017/0045996 A1 | 2/2017 | Ka et al. | |
| 2017/0309226 A1* | 10/2017 | In | ............................. G09G 3/20 |
| 2018/0060010 A1* | 3/2018 | Cho | .................... H04M 1/0268 |
| 2018/0356904 A1* | 12/2018 | Disano | .................. G06F 3/1423 |

FOREIGN PATENT DOCUMENTS

| | | | |
|---|---|---|---|
| CN | 106775515 A | 5/2017 |
| CN | 107025006 A | 8/2017 |
| CN | 107025089 A | 8/2017 |
| CN | 107765835 A | 3/2018 |
| CN | 108121495 A | 6/2018 |
| CN | 108205360 A | 6/2018 |
| CN | 108536411 A | 9/2018 |

OTHER PUBLICATIONS

Extended European Search Report in European Application No. 19905266.3, dated Jul. 15, 2021, 10 pages.
Office Action in Chinese Application No. 201811582459.1, dated Mar. 10, 2021, 19 pages.
Office Action issued in Chinese Application No. 201811582459.1 dated Jan. 21, 2022, 4 pages.

* cited by examiner

SCREEN-ON METHOD AND RELATED APPARATUS

CROSS-REFERENCE TO RELATED APPLICATIONS

This application is a continuation of International Application No. PCT/CN2019/122066, filed on Nov. 29, 2019, which claims priority to Chinese Patent Application No. 201811582459.1, filed on Dec. 24, 2018. The disclosures of the aforementioned applications are hereby incorporated by reference in their entireties.

TECHNICAL FIELD

This application relates to the field of electronic apparatus technologies, and in particular, to a screen-on method and a related apparatus.

BACKGROUND

With continuous development of electronic technologies, an electronic apparatus has become an important communication and entertainment tool in people's life. A user can obtain massive information and high-quality services from a network by using the electronic apparatus.

When using the electronic apparatus, the user can light up a screen by touching or tapping a corresponding button. Then the electronic apparatus displays various rich graphical interfaces by using the screen disposed on the electronic apparatus, for example, operation interfaces of various application programs or an operation interface of an operating system of the electronic apparatus.

In the foregoing screen-on manner, privacy leakage may be caused when the user performs an operation. Currently, a screen-on method that can protect user privacy is urgently needed.

SUMMARY

This application provides a screen-on method and a related apparatus, to protect user privacy when a screen is lighted up.

According to a first aspect, this application provides a screen-on method. The method including: If a screen of an electronic apparatus can be bent by using a bending axis, the screen is divided into at least two screen areas by using the bending axis; in a screen-off state, the electronic apparatus may obtain a first screen-on instruction; and then, the electronic apparatus may determine a first screen area based on rotation speeds or rotation accelerations at which the at least two screen areas rotate around the bending axis, where the first screen area may be a screen area that a user expects to light up first. In this case, the electronic apparatus may light up the first screen area according to the first screen-on instruction, and set a second screen area other than the first screen area to be in the screen-off state. In this method, user privacy can be protected when the screen is lighted up.

In a possible implementation, the determining, by the electronic apparatus, a first screen area based on rotation speeds or rotation accelerations at which the at least two screen areas rotate around the bending axis includes: obtaining, by the electronic apparatus, the rotation speeds or the rotation accelerations corresponding to the at least two screen areas; and determining, by the electronic apparatus, a screen area with a smallest rotation speed or a smallest rotation acceleration as the first screen area.

In a possible implementation, the obtaining, by an electronic apparatus, a first screen-on instruction includes: generating, by the electronic apparatus, the first screen-on instruction when detecting that an included angle between at least two screen areas is greater than a first threshold X and less than a second threshold Y, where X is greater than or equal to 0 degrees, and Y is less than or equal to 180 degrees.

In a possible implementation, before the generating, by the electronic apparatus, the first screen-on instruction when detecting that an included angle between the at least two screen areas is greater than a first threshold X, the included angle is less than or equal to X; and the generating, by the electronic apparatus, the first screen-on instruction when detecting that an included angle between the at least two screen areas is greater than a first threshold X includes: generating, by the electronic apparatus, the first screen-on instruction when detecting that the included angle increases to be greater than X.

In a possible implementation, before the generating, by the electronic apparatus, the first screen-on instruction when detecting that an included angle between the at least two screen areas is greater than a first threshold X and less than a second threshold Y, the method further includes: receiving, by the electronic apparatus, a screen-on touch instruction.

In a possible implementation, after the lighting up, by the electronic apparatus, the first screen area according to the first screen-on instruction, and setting a second screen area other than the first screen area to be in the screen-off state, the method further includes: generating, by the electronic apparatus, a second screen-on instruction when detecting that the included angle is greater than Y; and lighting up, by the electronic apparatus, the second screen area according to the second screen-on instruction.

In a possible implementation, after the lighting up, by the electronic apparatus, the second screen area according to the second screen-on instruction, the method further includes: generating, by the electronic apparatus, a first screen-off instruction when detecting that the included angle is greater than Z, where Z is greater than Y and less than or equal to 360 degrees; and setting, by the electronic apparatus according to the first screen-off instruction, the second screen area to enter the screen-off state.

In a possible implementation, after the lighting up, by the electronic apparatus, the second screen area according to the second screen-on instruction, the method further includes: generating, by the electronic apparatus, a second screen-off instruction when detecting that the included angle decreases from being an angle greater than or equal to Y to an angle being less than W, where W is less than or equal to Y and greater than X; and setting, by the electronic apparatus according to the second screen-off instruction, the second screen area to enter the screen-off state.

In a possible implementation, Y is greater than or equal to 90 degrees, and Z is greater than or equal to 180 degrees.

In a possible implementation, the determining, by the electronic apparatus, a first screen area based on rotation speeds or rotation accelerations at which the at least two screen areas rotate around the bending axis further includes: if the at least two screen areas correspond to a same rotation speed or a same rotation acceleration, determining the first screen area based on included angles between the at least two screen areas and a gravitational acceleration, or determining the first screen area based on an image collected by using a photographing apparatus on a side of one of the at least two screen areas.

According to a second aspect, this application provides a screen-on apparatus, including:

an obtaining module, configured to obtain, in a screen-off state, a first screen-on instruction on an electronic device, where a screen of the electronic apparatus is divided into at least two screen areas by using a bending axis;

a determining module, configured to determine a first screen area based on rotation speeds or rotation accelerations at which the at least two screen areas rotate around the bending axis; and a setting module, configured to: light up the first screen area according to the first screen-on instruction, and set a second screen area other than the first screen area to be in the screen-off state.

In a possible implementation, the determining module is configured to: obtain the rotation speeds or the rotation accelerations corresponding to the at least two screen areas; and determine a screen area with a smallest rotation speed or a smallest rotation acceleration as the first screen area.

In a possible implementation, the obtaining module is configured to generate the first screen-on instruction when detecting that an included angle between the at least two screen areas is greater than a first threshold X and less than a second threshold Y, where X is greater than or equal to 0 degrees, and Y is less than or equal to 180 degrees.

In a possible implementation, before the obtaining module generates the first screen-on instruction when detecting that the included angle between the at least two screen areas is greater than the first threshold X, the included angle is less than or equal to X. The obtaining module is further configured to generate the first screen-on instruction when detecting that the included angle increases to be greater than X.

In a possible implementation, the obtaining module is configured to receive a screen-on touch instruction.

In a possible implementation, the obtaining module is further configured to: after the electronic apparatus lights up the first screen area according to the first screen-on instruction, and sets the second screen area other than the first screen area to be in the screen-off state, generate a second screen-on instruction when detecting that the included angle is greater than Y. The setting module is further configured to light up the second screen area according to the second screen-on instruction.

In a possible implementation, the obtaining module is further configured to: after the electronic apparatus lights up the second screen area according to the second screen-on instruction, generate a first screen-off instruction when detecting that the included angle is greater than Z, where Z is greater than Y and less than or equal to 360 degrees. The setting module is further configured to set, according to the first screen-off instruction, the second screen area to enter the screen-off state.

In a possible implementation, the obtaining module is further configured to: after the electronic apparatus lights up the second screen area according to the second screen-on instruction, generate a second screen-off instruction when detecting that the included angle decreases from an angle being greater than or equal to Y to an angle being less than W, where W is less than or equal to Y and greater than X.

The setting module is further configured to set, according to the second screen-off instruction, the second screen area to enter the screen-off state.

In a possible implementation, the determining module is further configured to: if the at least two screen areas correspond to a same rotation speed or a same rotation acceleration, determine the first screen area based on included angles between the at least two screen areas and a gravitational acceleration, or determine the first screen area based on an image collected by using a photographing apparatus on a side of one of the at least two screen areas.

According to a third aspect, this application provides a screen-on apparatus, including:

one or more processors; and a storage apparatus, configured to store one or more programs; where when the one or more programs are executed by the one or more processors, the one or more processors implement the screen-on method in the first aspect.

According to a fourth aspect, this application provides a terminal, including:

a display and a processor, where the processor is configured to perform the screen-on method in the first aspect.

According to a fifth aspect, this application provides a computer-readable storage medium. The computer-readable storage medium stores an instruction, and the instruction is run on a computer, to perform the screen-on method in the first aspect.

According to a sixth aspect, this application provides a computer program. The computer program is executed by a computer, to perform the screen-on method in the first aspect.

BRIEF DESCRIPTION OF DRAWINGS

FIG. 6A-1 and FIG. 6A-2 are a flowchart 2 of a screen-on method according to this application;

DESCRIPTION OF EMBODIMENTS

Terms used in implementations of this application are used only to explain specific embodiments of this application, but are not intended to limit this application.

To resolve a problem of privacy leakage in an operation process in which a user uses an electronic apparatus, this application provides a screen-on method. The following first provides description by using an electronic apparatus to which the screen-on method provided in this application is applied as an example.

Figure 1A:
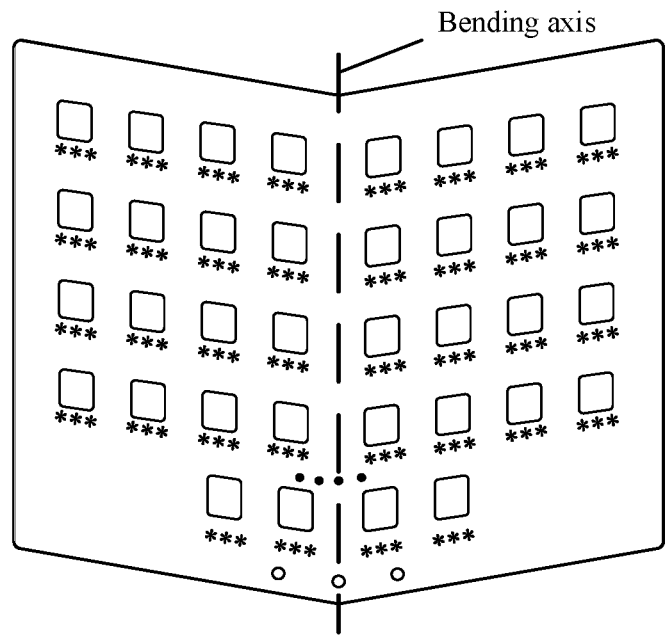
FIG. 1A is a schematic diagram of an electronic apparatus with a flexible screen.
Figure 1B:
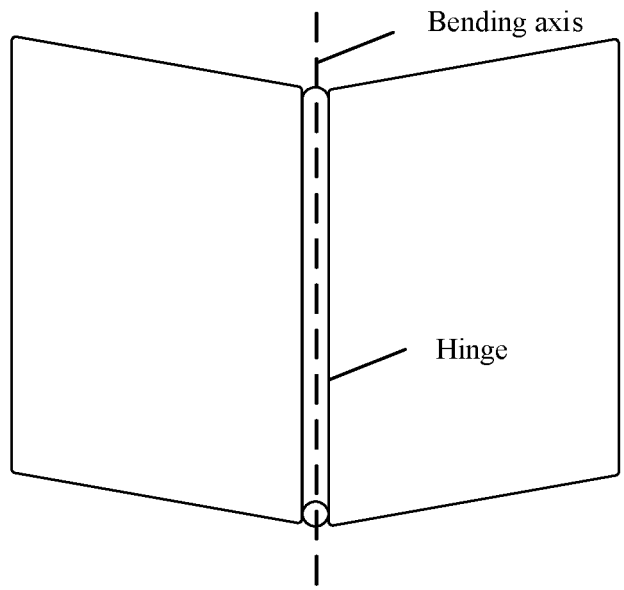
FIG. 1B is a schematic diagram of an electronic apparatus with a combined screen.

In this application, a screen of the electronic apparatus may be a flexible screen, or may be a combined screen constituted by hinging a plurality of non-flexible screens. FIG. 1A is a schematic diagram of an electronic apparatus with a flexible screen. FIG. 1B is a schematic diagram of an electronic apparatus with a combined screen. As shown in FIG. 1A and FIG. 1B, a screen of an electronic apparatus is divided into at least two screen areas by using a bending axis, and each screen area may be rotated around a hinge by using a bending axis as a center. A user may perform a flip operation on each screen area. For example, the user may open a screen in a folded state or close a screen in an open state, like opening or closing a book.

Figure 2:
FIG. 2 is a schematic diagram 1 of a scenario to which a screen-on method according to this application is applied.

Based on the electronic apparatus, this application provides a screen-on method. FIG. 2 is a schematic diagram 1 of a scenario to which the screen-on method according to this application is applied. As shown in FIG. 2, when a screen is lighted up, only a first screen area that a user actually expects to view is lighted up, and a second screen area other than the first screen area of an electronic apparatus is set to keep a screen-off state. In this way, user privacy can be protected.

The following describes in detail the screen-on method provided in this application.

Figure 3A:
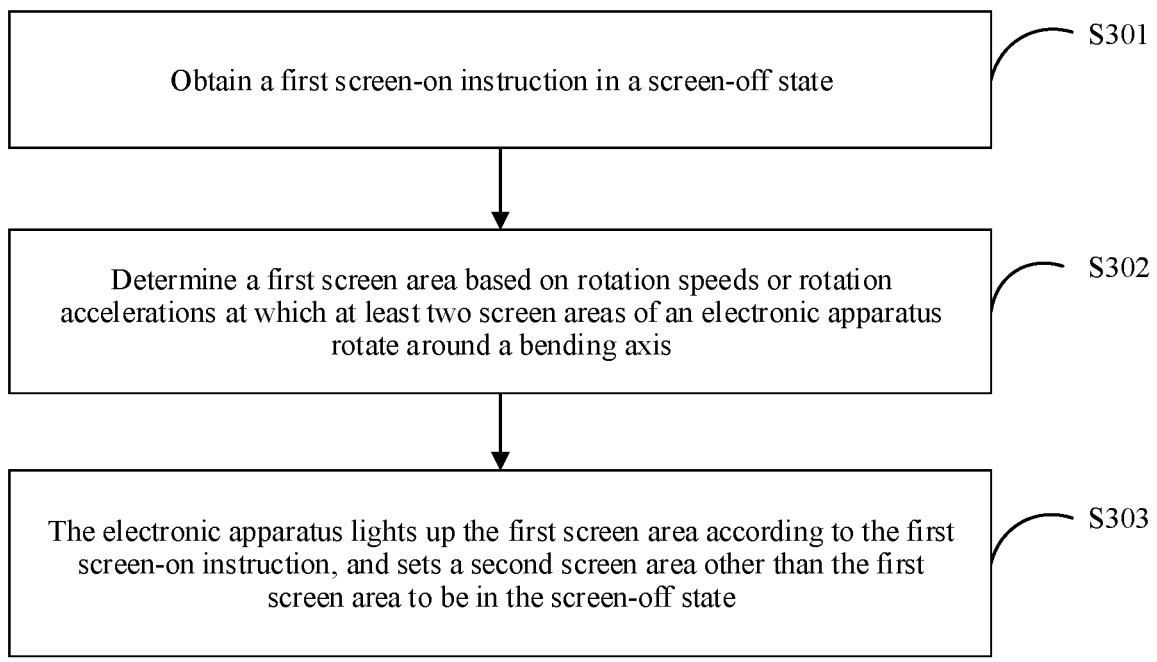
FIG. 3A is a flowchart 1 of a screen-on method according to this application.

FIG. 3A is a flowchart 1 of a screen-on method according to this application. This embodiment of this application may be executed by an electronic apparatus with a bendable screen. As shown in FIG. 3A, the following steps in this embodiment of this application are included.

S301: Obtain a first screen-on instruction in a screen-off state.

In this embodiment of this application, before the electronic apparatus obtains the first screen-on instruction, the electronic apparatus may be in the screen-off state. An example in which a screen of the electronic apparatus includes two screen areas is used. In this case, an included angle between the two screen areas may remain unchanged, to be specific, a posture constituted by relative positions of the two screen areas may remain unchanged. In an example, the two screen areas may remain static.

In this embodiment of this application, the step of obtaining the first screen-on instruction by the electronic apparatus may be implemented in any one of the following manners and a combination thereof.

Figure 3B:
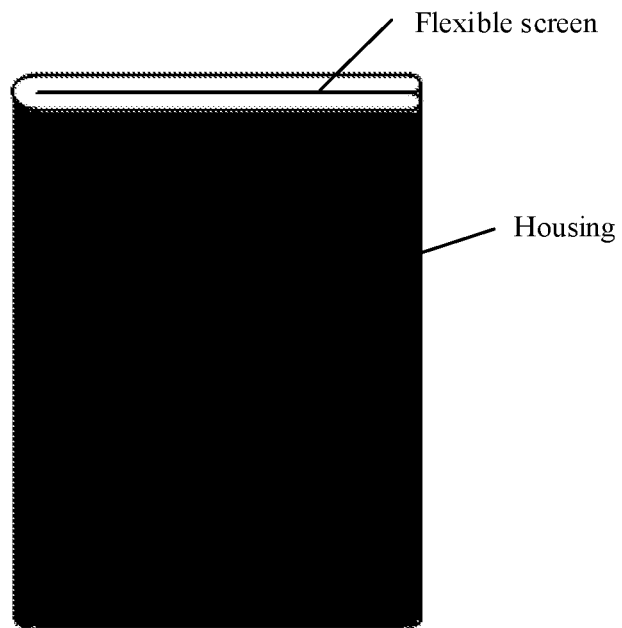
FIG. 3B is a schematic diagram 1 of a bent state of a screen.

In an implementation, the electronic apparatus may generate the first screen-on instruction when detecting that the included angle between the at least two screen areas is greater than a first threshold X. A value of X may be set based on a sensitivity requirement of a user for lighting up the screen. For example, X may be greater than or equal to 0 degrees and less than 90 degrees. In an example, the value of X may be 0 degrees. Before the electronic apparatus detects that the included angle between the two screen areas is greater than 0 degrees, an initial state of the included angle between the two screen areas may be 0 degrees. FIG. 3B is a schematic diagram 1 of a bent state of a flexible screen on a housing. As shown in FIG. 3B, two screen areas are in a closed state. When the user performs an operation to open the two screen areas, the electronic apparatus may detect that the included angle between the two screen areas is greater than 0 degrees. In this case, a first screen-on instruction may be generated. In another example, the value of X may be 15 degrees. In this case, when the electronic apparatus detects that the included angle between the two screen areas is between 0 degree and 15 degrees, an initial state of the included angle may be 5 degrees. When the user performs an operation to open the two screen areas until the included angle is greater than 15 degrees, a first screen-on instruction is generated. In another embodiment of this application, the value of X may alternatively be 60 degrees or the like.

In another implementation, the electronic apparatus may generate the first screen-on instruction when detecting that the included angle between the at least two screen areas is greater than a first threshold X and less than a second threshold Y, where X is greater than or equal to 0 degrees, and Y is less than or equal to 180 degrees. For example, X may be 10 degrees and Y may be 90 degrees. In this embodiment of this application, before the electronic apparatus generates the first screen-on instruction when detecting that the included angle between the at least two screen areas is greater than the first threshold X, the included angle between the screen areas is less than or equal to X. That the electronic apparatus generates the first screen-on instruction when detecting that the included angle between the at least two screen areas is greater than the first threshold X includes that the electronic apparatus generates the first screen-on instruction when detecting that the included angle increases to be greater than X.

In still another implementation, before the generating, by the electronic apparatus, the first screen-on instruction when detecting that an included angle between the at least two screen areas is greater than a first threshold X and less than a second threshold Y, the method further includes: receiving, by the electronic apparatus, a screen-on touch instruction. For example, a button may be disposed on the electronic apparatus, and when a user presses the button, a screen-on touch instruction is triggered to be generated.

S302: Determine a first screen area based on rotation speeds or rotation accelerations at which the at least two screen areas rotate around a bending axis.

In this embodiment of this application, the at least two screen areas may include the first screen area and a second screen area. The first screen area may be a screen area that is initially focused by eyes of the user when the user expects to use the electronic apparatus, that is, a screen area that needs to be lighted up when the screen is lighted up. The second screen area is a screen area that does not need to be lighted up temporarily when the first screen area is lighted up, that is, a screen area that needs to keep the screen-off state when the first screen area is lighted up. For example, when an included angle between screen areas is 90 degrees, where one screen area faces the user and the other screen area is perpendicular to a sight line of the user, a screen area that the user actually expects to view is the screen area facing the user. To be specific, the screen area facing the user may be referred to as the first screen area, and the screen area perpendicular to the sight line of the user may be referred to as the second screen area.

In this embodiment of this application, when the user expects to use the electronic apparatus, a general operation habit of the user is to lift the screen of the electronic apparatus to a line-of-sight range of the user, and then operate the screen of the electronic apparatus. For example, the operation of the user may be performed in any one of the following modes.

In an example of an operation mode, the user may respectively hold outer edges of the two screen areas by using two hands. One hand is used to fasten one of the screen areas to keep static relative to the bending axis, and the other hand is used to open the other screen area to rotate the other screen area around the bending axis. This operation is similar to an operation of reading a book with one hand holding the book and the other hand opening a first page of the book.

In an example of another operation mode, the user may respectively hold outer edges of the two screen areas by using two hands, so that front sides of the two screen areas are far away from each other.

Figure 3C:
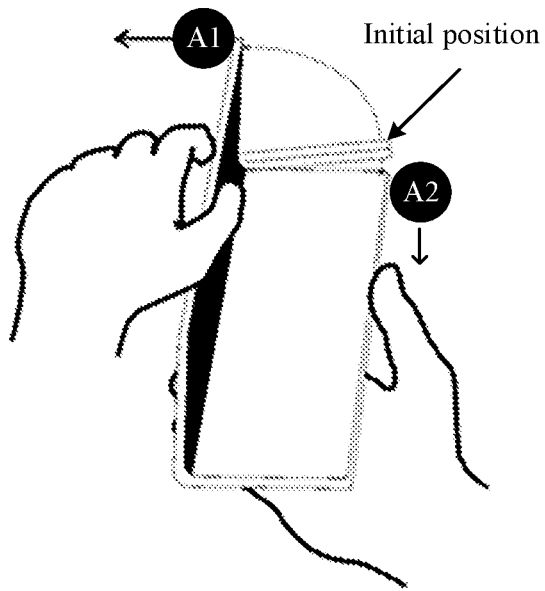
FIG. 3C is a schematic diagram of a scenario to which an electronic apparatus with an acceleration sensor is applied.

When the user operates the screen of the electronic apparatus in the foregoing mode, the two screen areas have specific rotation speeds or specific rotation accelerations relative to the bending axis. A speed or an acceleration of the screen area facing the user is usually smaller, and a speed or an acceleration of the other screen area is usually larger. Therefore, in this embodiment of this application, that the electronic apparatus may perform the following steps to determine a first screen area based on rotation speeds or rotation accelerations at which the at least two screen areas rotate around a bending axis: obtaining the rotation speeds or the rotation accelerations corresponding to the at least two screen areas; and determining a screen area with a smallest rotation speed or a smallest rotation acceleration as the first screen area. It should be noted that a rotation speed corresponding to each screen area is an angular speed at which the screen area rotates around the bending axis, and a rotation acceleration corresponding to each screen area is an angular acceleration at which the screen area rotates around the bending axis. FIG. 3C is a schematic diagram of a scenario to which an electronic apparatus with an acceleration sensor is applied. As shown in FIG. 3C, in this embodiment of this application, acceleration sensors may be respectively disposed in two screen areas of the electronic apparatus, and a rotation acceleration corresponding to each screen area may be obtained through detection by using an acceleration sensor corresponding to the screen area. For example, A1 may be an acceleration of a left screen, e.g., from an initial position in the figure, and A2 may be an acceleration of a right screen, e.g., from an initial position in the figure.

In this application, for the flexible screen, the bending axis may be any bending line on which the user operates the screen for bending. For example, if the screen is a rectangle when no bending occurs, the bending axis may be a line parallel to any side. In an example, the bending axis may divide the screen into left and right screen areas. In another example, the bending axis may divide the screen into upper and lower screen areas. A position of the bending axis is not limited in this application.

S303: The electronic apparatus lights up the first screen area according to the first screen-on instruction, and sets the second screen area other than the first screen area to be in the screen-off state.

In this embodiment of this application, after obtaining the first screen-on instruction, the electronic apparatus lights up the first screen area determined in step S302, and sets the second screen area to be in the screen-off state, so that a plurality of kinds of high-quality experience can be provided for the user.

According to a first aspect, when the user needs to light up the screen, only the first screen area that the user expects to view is lighted up, so that privacy leakage displayed in the second screen area can be avoided.

According to a second aspect, according to this screen-on method, electric energy may be further saved because only a partial screen area is lighted up.

Figure 3D:
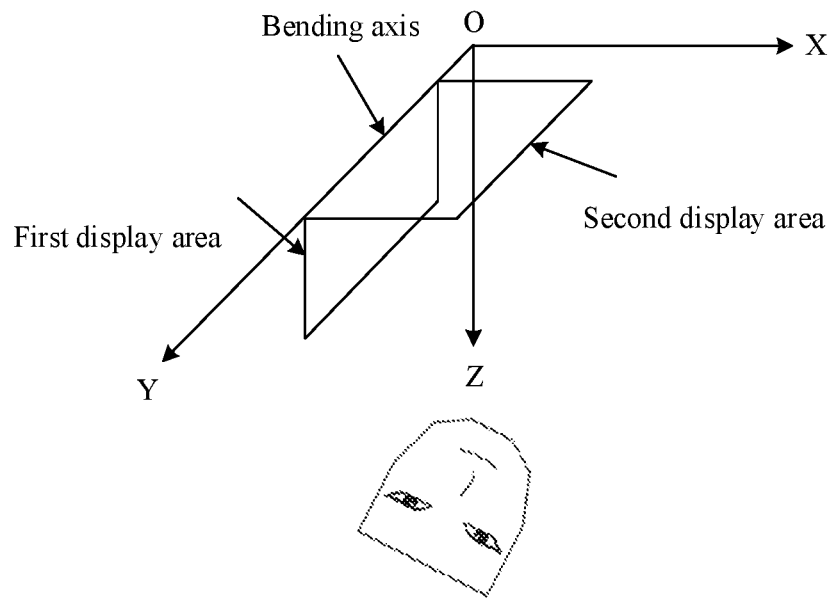
FIG. 3D is a schematic diagram 2 of a scenario to which a screen-on method according to this application is applied.

According to a third aspect, according to this screen-on method, a correct first screen area may be determined when the user holds the electronic apparatus in any posture. For example, when the user sits, a front side of a screen area is usually opposite to a direction of a gravity acceleration, to be specific, an included angle between the front side of the screen area and the direction of the gravity acceleration is greater than 90 degrees from top to bottom of the sight line of the user. The correct first screen area may be determined based on a rotation speed or a rotation acceleration corresponding to each screen area. When the user is laying down, a front side of a screen area is usually approximately the same as a direction of a gravity acceleration, to be specific, an included angle between the front side of the screen area and the direction of the gravity acceleration is less than 90 degrees from bottom to top of the sight line of the user. The correct first screen area may alternatively be determined based on a rotation speed or a rotation acceleration that correspond to each screen area. FIG. 3D is a schematic diagram 2 of a scenario to which a screen-on method according to this application is applied.

According to a fourth aspect, according to this screen-on method, a correct first screen area may be quickly determined. It should be noted that, in this method, a relative position relationship between the user and the electronic apparatus is determined without detecting the face of the user by a camera. In this case, the first screen area is determined without collecting a face image of the user only when the included angle between the screen areas increases to a comparatively large angle. According to the method provided in this embodiment of this application, the first screen area can be quickly determined when the included angle between the screen areas just increases from 0 degrees to more than 0 degrees.

According to a fifth aspect, accuracy of determining the first screen area by using this screen-on method is comparatively high. It should be noted that, if an error may exist when the first screen area is determined by collecting a face orientation of the user, for example, the face orientation of the user changes when the user prepares to light up the screen, the first screen area determined based on the face orientation may not be a first screen area that the user actually expects to light up. However, according to the method provided in this embodiment of this application, the user usually holds one screen area and flips the other screen area. A value relationship between the rotation speeds or the rotation accelerations of the two screen areas is comparatively stable, and the value relationship is comparatively stable may be represented as: within a period of time, a rotation angular velocity of a first screen area of the two screen areas is always greater than a rotation angular velocity of a second screen area, or a rotation angular velocity of a first screen area is always less than a rotation angular velocity of a second screen area. Therefore, it can be ensured that the first screen area determined based on the rotation speeds or the rotation accelerations does not change within the period of time. In this way, the accuracy of determining the first screen area can be ensured.

In this application, the operation of the user may alternatively include the following case: The user may respectively hold outer edges of the two screen areas by using two hands, so that front sides of the two screen areas are far away from each other, and speeds or accelerations at which the two screen areas rotate around the bending axis are the same. In this case, the electronic apparatus may alternatively use the following manner to determine the first screen area based on the rotation speeds or the rotation accelerations at which the at least two screen areas rotate around the bending axis:

obtaining the rotation speeds or the rotation accelerations corresponding to the at least two screen areas; and if the at least two screen areas correspond to a same rotation speed or a same rotation acceleration, determining the first screen area based on included angles between the at least two screen areas and a gravitational acceleration, determining the first screen area based on an image collected by using a photographing apparatus on a side of one of the at least two screen areas, or determining a preset default first screen area as the first screen area.

Figure 4:
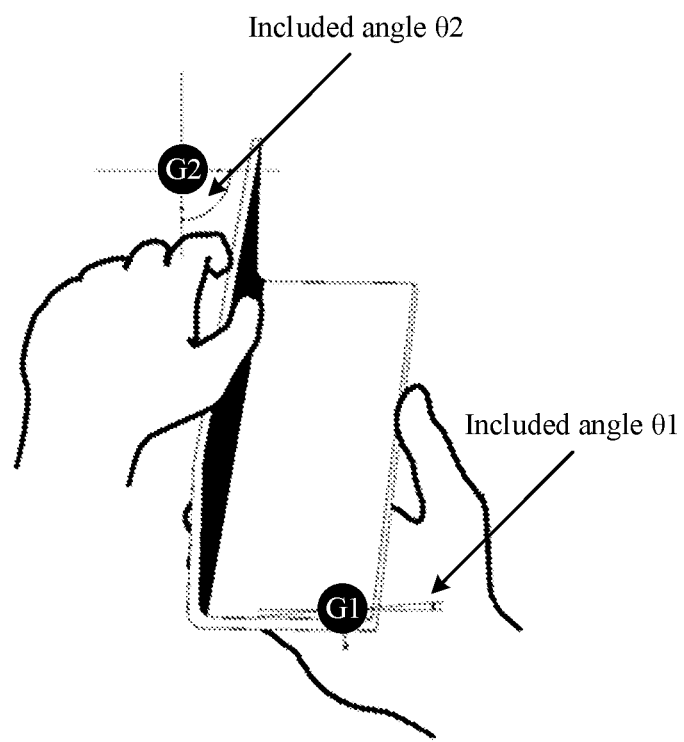
FIG. 4 is a schematic diagram of a scenario to which an electronic apparatus with a gyroscope and a gravitational acceleration sensor is applied.

In this embodiment of this application, the step of determining the first screen area based on included angles between the at least two screen areas and a gravitational acceleration may include: obtaining an included angle between each screen area and the gravitational acceleration, and selecting a screen area corresponding to a greatest included angle as the first screen area. It should be noted that an included angle between any screen area and the gravity acceleration is an included angle between a front side, used for display, of the screen area and a direction of the gravity acceleration. FIG. 4 is a schematic diagram of a scenario to which an electronic apparatus with a gyroscope and a gravitational acceleration sensor is applied. As shown in FIG. 4, in this application, an included angle between a screen area and a gravitational acceleration may be detected by using a gyroscope and an acceleration sensor (G-Sensor), or another architecture. This is not limited in this application. In an example, as shown in FIG. 4, an included angle θ1 shown on a right side of G1 in the figure is an included angle between a back side of a right screen and a horizontal plane, and an included angle θ2 shown on a right side of G2 in the figure is an included angle between a front side of a left screen and the horizontal plane.

Figure 5A:
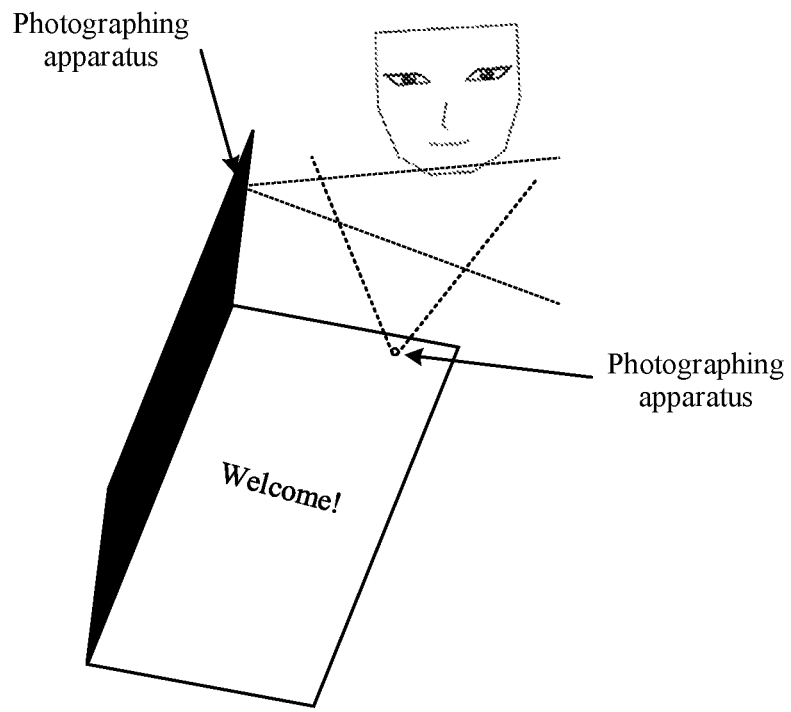
FIG. 5A is a schematic diagram 1 of an electronic apparatus with a photographing apparatus.
Figure 5B:
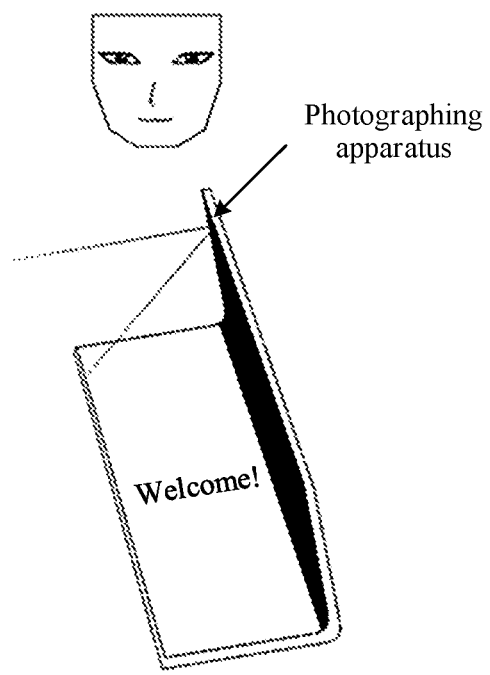
FIG. 5B is a schematic diagram 2 of an electronic apparatus with a photographing apparatus.

In this embodiment of this application, an example in which the at least two screen areas are two screen areas is used. The photographing apparatus may be disposed on a side of at least one of the two screen areas. Any one of the following implementations may be used to determine the first screen area based on the image collected by using the photographing apparatus on the side of one of the at least two screen areas. In an example, FIG. 5A is a schematic diagram 1 of an electronic apparatus with a photographing apparatus. As shown in FIG. 5A, if the photographing apparatus is disposed on a side of at least one of two screen areas, the screen area with the side on which the photographing apparatus that collects a front face image of a user is located can be determined as a first screen area. In another example, FIG. 5B is a schematic diagram 2 of an electronic apparatus with a photographing apparatus. As shown in FIG. 5B, if a photographing apparatus is disposed on a side of only one of two screen areas and the photographing apparatus does not collect a front face image of a user, a screen area with a side on which no photographing apparatus is disposed can be determined as the first screen area. It should be noted that the front face image may be verified based on any one or a combination of a plurality of front side images of an eye, the nose, the mouth, and an ear of the user. This is not limited in this application. In another embodiment of this application, the photographing apparatus may alternatively be an infrared photographing apparatus.

In this embodiment of this application, the preset first screen area may be a screen area of the two screen areas that is close to the right hand, or may be a screen area of the two screen areas that is close to the left hand. For example, setting may be performed based on a habit of the user.

In the foregoing manner, when the user operates the screen of the electronic apparatus, the first screen area that needs to be lighted up can be determined when the rotation speeds or the rotation accelerations corresponding to the screen areas are the same, to protect user privacy, save energy, and the like.

In another embodiment of this application, the first screen area may alternatively be determined by using a combination of the foregoing implementations. For example, the first screen area may be first determined based on a front image of the user collected by using the photographing apparatus. If neither of images of the user collected by using two photographing apparatuses can be determined as front images of the user, the first screen area can be determined through cooperation between a dual gyroscope and the G-sensor. A combination order of the foregoing implementations of determining the first screen area can be determined based on accuracy of determining the first screen area within a preset time.

In another embodiment of this application, if the rotation speeds or the rotation accelerations of the screen areas are the same, it may be considered that the user actually expects to view a complete screen. In this case, the complete screen of the electronic apparatus can be directly determined as the first screen area.

Based on any one of the foregoing embodiments, an embodiment of this application further provides a screen-on method. The following provides an example in which a screen of an electronic apparatus may be divided into a first display area and a second display area by using a bending axis for description.

Figures 1, 6A:
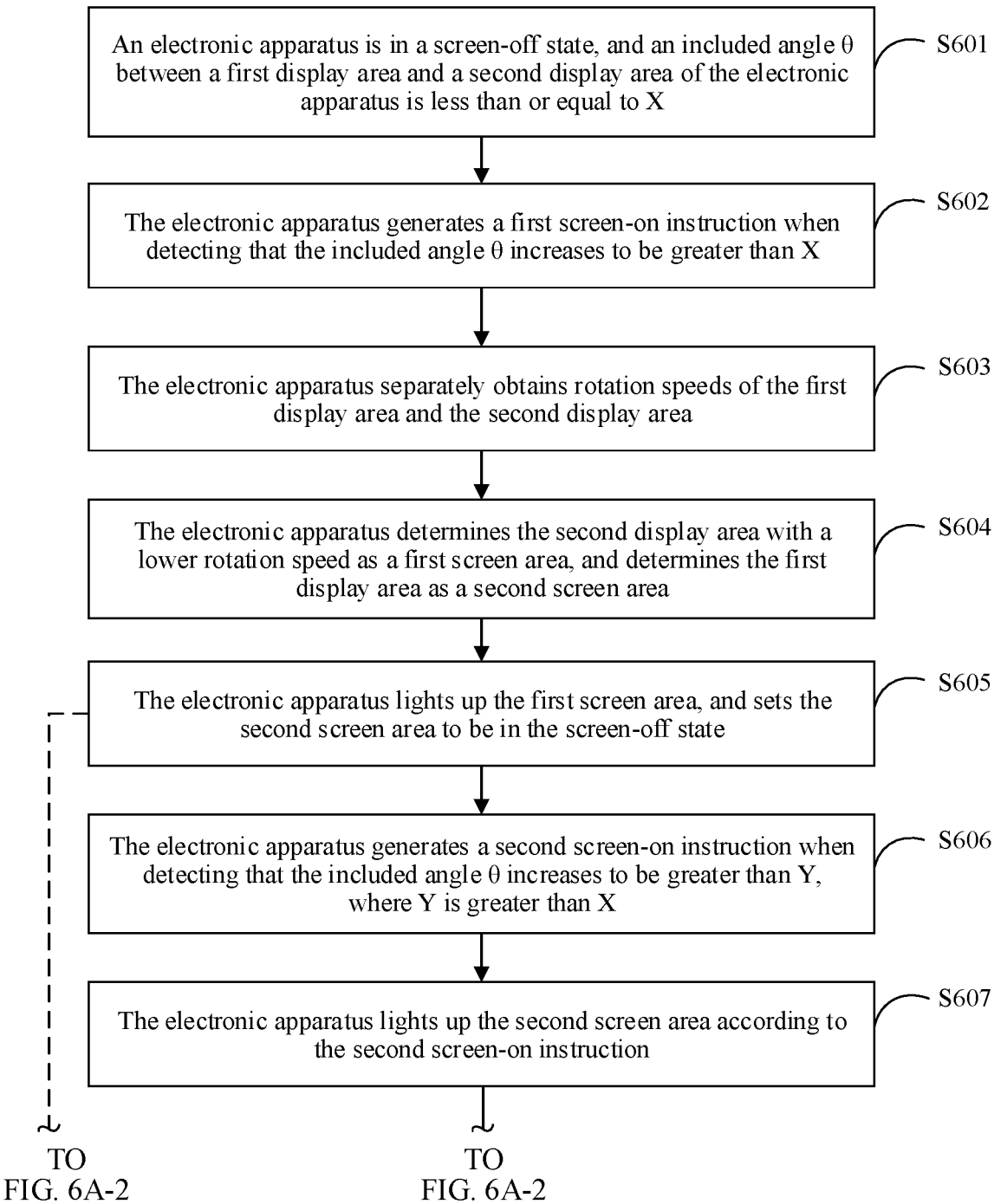
Figures 2, 6A:
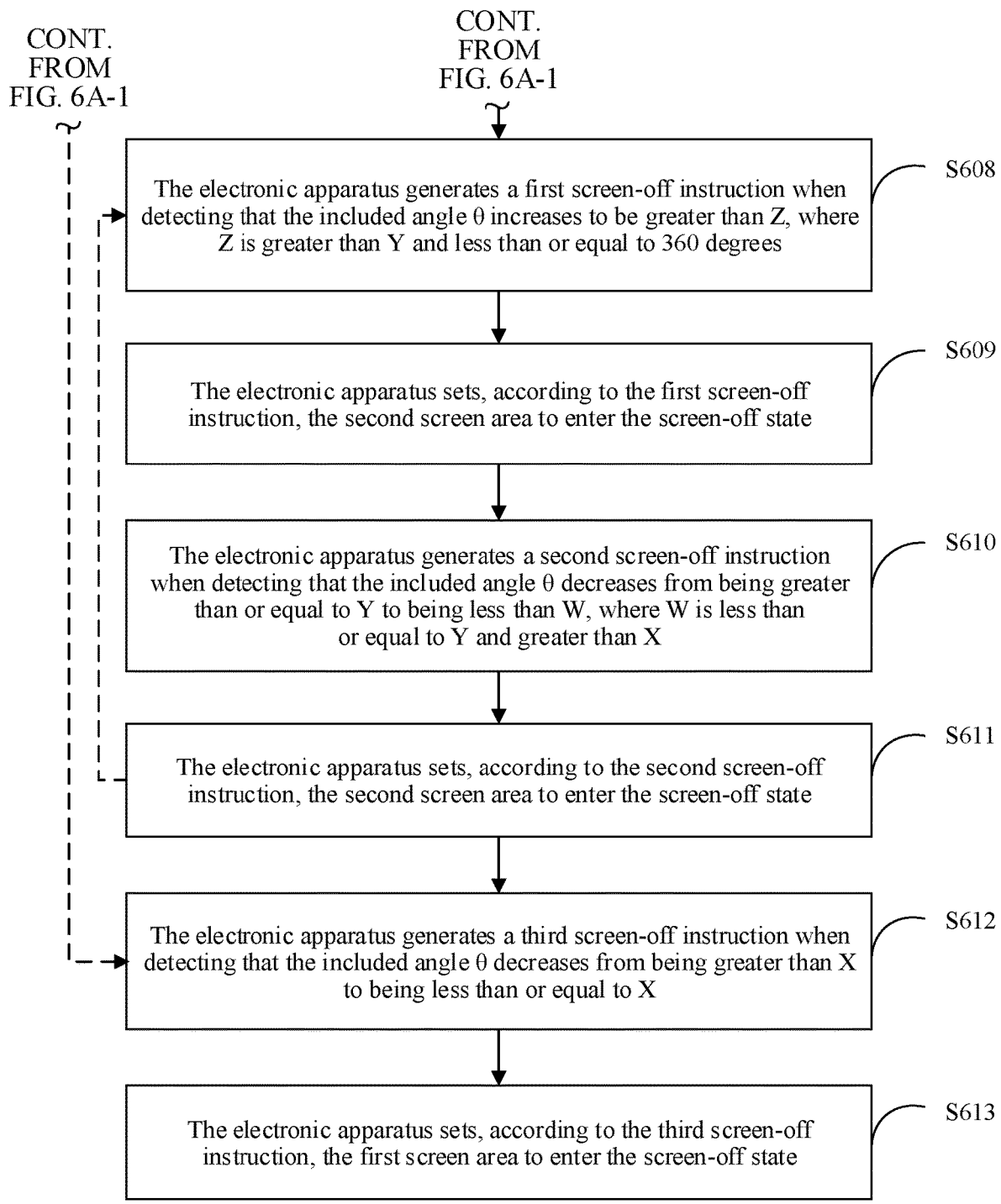

FIG. 6A-1 and FIG. 6A-2 are a flowchart 2 of a screen-on method according to this application. As shown in FIG. 6A-1 and FIG. 6A-2, this embodiment of this application may include the following steps.

S601: An electronic apparatus is in a screen-off state, and an included angle θ between a first display area and a second display area of the electronic apparatus is less than or equal to X.

Figure 6B:
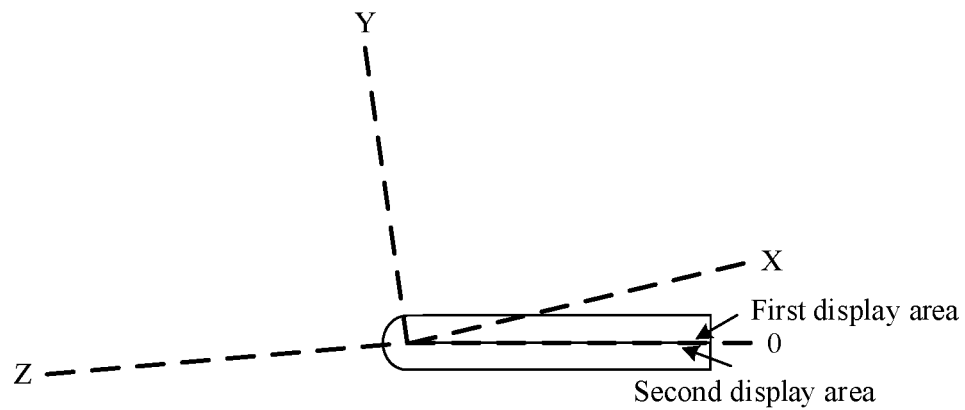
FIG. 6B is a schematic diagram 2 of a bent state of a screen.

X is greater than or equal to 0 degrees and less than or equal to 180 degrees. For example, X may be equal to 0 degrees, 15 degrees, 30 degrees, or the like. FIG. 6B is a schematic diagram 2 of a bent state of a screen. An included angle θ shown in FIG. 6B is 0 degrees, and X may be 15 degrees.

S602: The electronic apparatus generates a first screen-on instruction when detecting that the included angle θ increases to be greater than X.

Figure 6C:
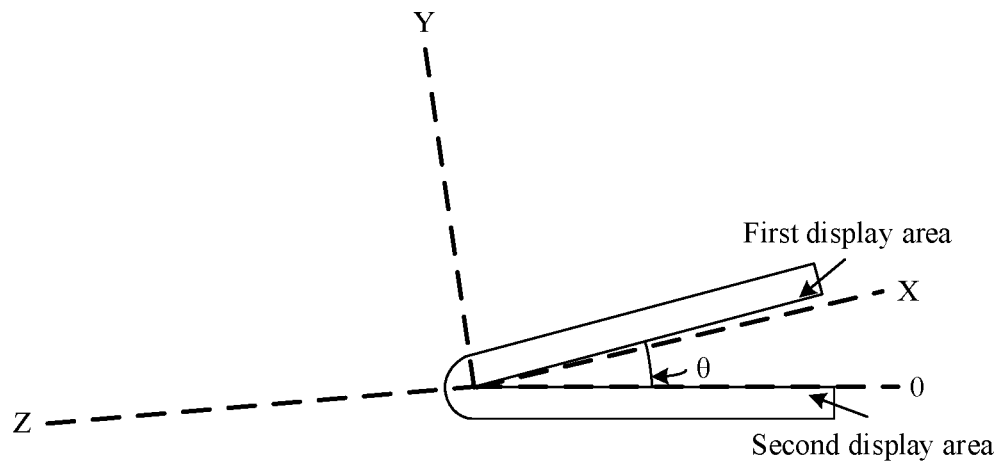
FIG. 6C is a schematic diagram 3 of a bent state of a screen.

A user may operate a screen by using both hands, so that the included angle between the first display area and the second display area increases. FIG. 6C is a schematic diagram 3 of a bent state of a screen. An included angle θ shown in FIG. 6C may be 16 degrees. In another embodiment of this application, the electronic apparatus may alternatively generate the first screen-on instruction after detecting that the user presses a screen-on touch button.

S603: The electronic apparatus separately obtains rotation speeds of the first display area and the second display area.

Alternatively, the electronic apparatus may separately obtain rotation accelerations of the first display area and the second display area.

S604: The electronic apparatus determines the second display area with a lower rotation speed as a first screen area, and determines the first display area as a second screen area.

S605: The electronic apparatus lights up the first screen area, and sets the second screen area to be in the screen-off state.

In an implementation, after S605, this embodiment of this application may further include the following steps S606 and S607.

S606: The electronic apparatus generates a second screen-on instruction when detecting that the included angle θ increases to be greater than Y, where Y is greater than X.

Figure 6D:
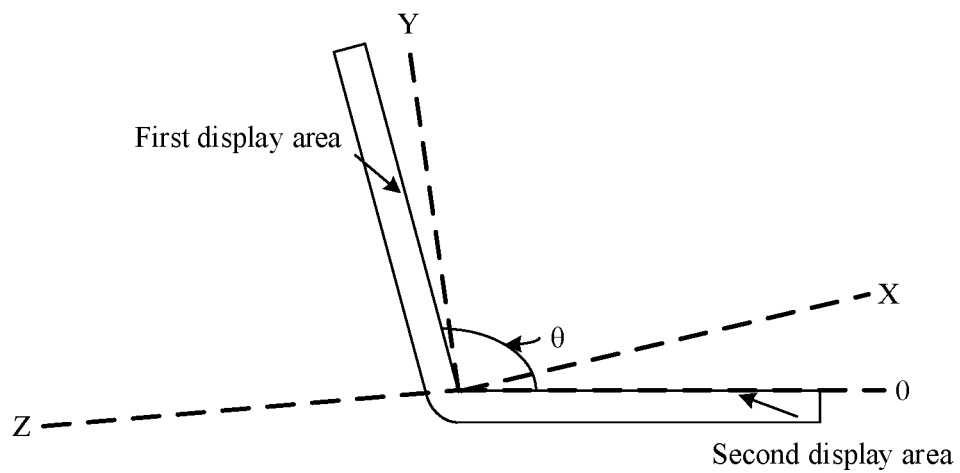
FIG. 6D is a schematic diagram 4 of a bent state of a screen.

For example, Y may be equal to 90 degrees, 100 degrees, 120 degrees, or the like. FIG. 6D is a schematic diagram 4 of a bent state of a screen. An included angle θ shown in FIG. 6D is 120 degrees, X is 15 degrees, and Y is 100 degrees.

S607: The electronic apparatus lights up the second screen area according to the second screen-on instruction.

In an implementation, after step S607, this embodiment of this application may further include the following steps S608 and S609.

S608: The electronic apparatus generates a first screen-off instruction when detecting that the included angle θ increases to be greater than Z, where Z is greater than Y and less than or equal to 360 degrees.

Figure 6E:
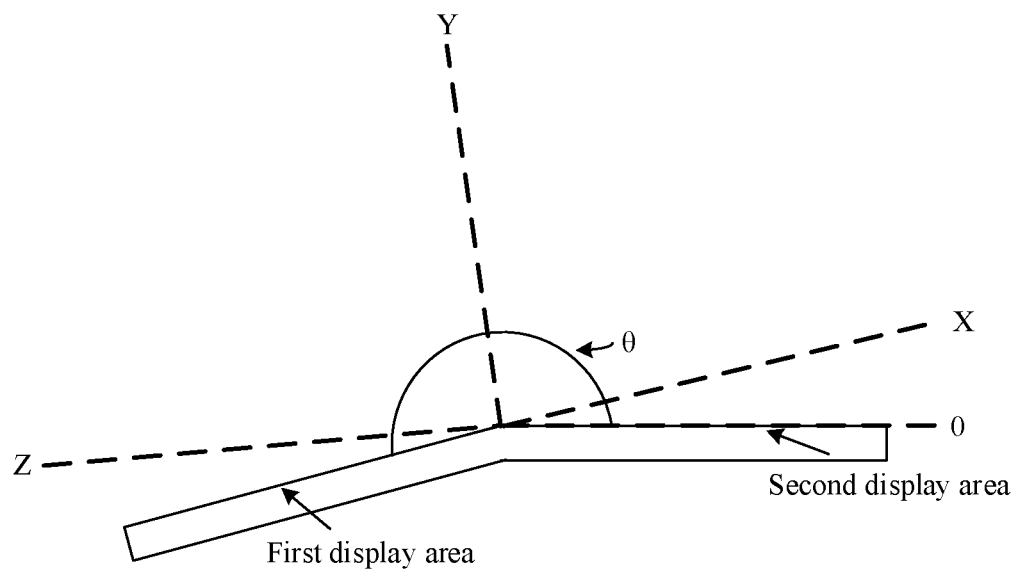
FIG. 6E is a schematic diagram 5 of a bent state of a screen.

For example, Y is greater than or equal to 90 degrees, and Z is greater than or equal to 180 degrees. In an example, Z may be 190 degrees. FIG. 6E is a schematic diagram 5 of a bent state of a screen. An included angle θ shown in FIG. 6E is 195 degrees, X is 15 degrees, Y is 100 degrees, and Z is 190 degrees.

S609: The electronic apparatus sets, according to the first screen-off instruction, the second screen area to enter the screen-off state.

In an implementation, after step S609, this embodiment of this application may further include the following steps S610 and S611.

S610: The electronic apparatus generates a second screen-off instruction when detecting that the included angle θ decreases from an angle being greater than or equal to Y to an angle being less than W, where W is less than or equal to Y and greater than X.

In an example, when Y is 100 degrees, W may be 100 degrees. In another example, when Y is 100 degrees, W may be 95 degrees. For example, a bent state of the screen of the electronic apparatus may change from FIG. 6C to FIG. 6B.

S611: The electronic apparatus sets, according to the second screen-off instruction, the second screen area to enter the screen-off state.

When the second screen area is set to enter the screen-off state, the first screen area is kept a screen-on state.

In this embodiment of this application, after step S611, steps S608 and S609 may be further included.

In an implementation, after step S605 or S611, steps S612 and S613 may be further included.

S612: The electronic apparatus generates a third screen-off instruction when detecting that the included angle θ decreases from being greater than X to being less than or equal to X.

For example, the bent state of the screen of the electronic apparatus may change from FIG. 6D to FIG. 6C.

S613: The electronic apparatus sets, according to the third screen-off instruction, the first screen area to enter the screen-off state.

In this case, the full screen of the electronic apparatus is in the screen-off state.

According to the screen-on method provided in this embodiment of this application, the electronic apparatus may perform, based on a detected change of the included angle between the screen areas, light-up and screen-off operations on the first screen area determined based on the rotation speeds or the rotation accelerations of the screen areas.

In another embodiment of this application, after the first screen area is determined based on the rotation speeds or the rotation accelerations corresponding to the screen areas, in addition to lighting up the first screen area and setting the second screen area to be in the screen-off state, the electronic apparatus in this embodiment of this application may further perform target operations in the following several implementations. In an implementation, the electronic apparatus may set the first screen area and the second screen area to display content based on different display ratios. The display ratios may include 16:9, 4:3, 18:9, and the like. In an example, the electronic apparatus may display content in the first screen area based on a ratio of 16:9, and display content in the second screen area based on a ratio of 4:3. In another implementation, the electronic apparatus may set the first screen area and the second screen area to present different application content. The different application content may include, for example, a common App, a notification center, a control center, and lock screen authentication. In an example, the electronic apparatus may display the common App in the first screen area, and display the control center in the second screen area. In still another implementation, the electronic apparatus may perform different application operations in the first screen area and the second screen area. The different application operations may include, for example, turning a page, returning to a home page, opening or viewing a plurality of tasks or a plurality of Apps. In an example, the electronic apparatus may set the first screen area to present an interface of a recently opened App, and present, in the second screen area, thumbnails of the plurality of Apps running in the background. In these manners, although the first screen area and the second screen are lighted up simultaneously, content displayed in the second screen area may also be prevented from leaking user privacy.

Figure 7:
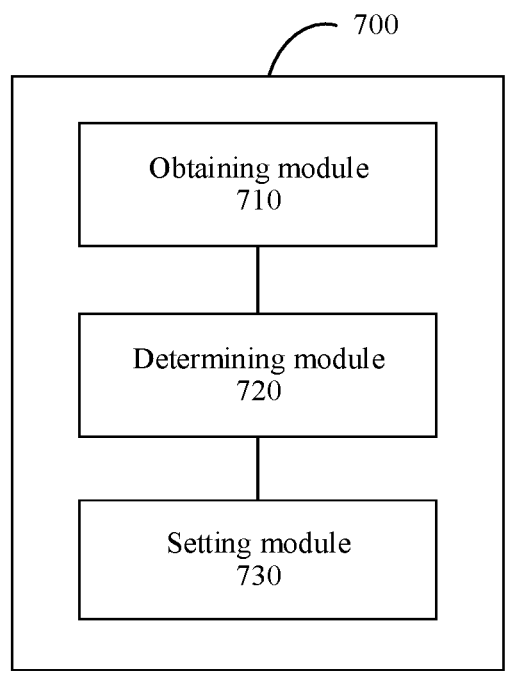
FIG. 7 is a schematic structural diagram of a screen-on apparatus according to this application.

This application further provides a screen-on apparatus. FIG. 7 is a schematic structural diagram of a screen-on apparatus 700 according to this application. As shown in FIG. 7, the screen-on apparatus 700 provided in this application may include an obtaining module 710, a determining module 720, and a setting module 730.

The obtaining module 710 is configured to obtain, in a screen-off state, a first screen-on instruction on an electronic device, where a screen of the electronic apparatus is divided into at least two screen areas by using a bending axis.

The determining module 720 is configured to determine a first screen area based on rotation speeds or rotation accelerations at which the at least two screen areas rotate around the bending axis.

The setting module 730 is configured to: light up the first screen area according to the first screen-on instruction, and set a second screen area other than the first screen area to be in the screen-off state.

In a possible implementation, the determining module 720 may be configured to: obtain the rotation speeds or the rotation accelerations corresponding to the at least two screen areas; and determine a screen area with a smallest rotation speed or a smallest rotation acceleration as the first screen area.

In a possible implementation, the obtaining module 710 may be configured to generate the first screen-on instruction when detecting that an included angle between the at least two screen areas is greater than a first threshold X and less than a second threshold Y, where X is greater than or equal to 0 degrees, and Y is less than or equal to 180 degrees.

In a possible implementation, before the obtaining module 710 generates the first screen-on instruction when detecting that the included angle between the at least two screen areas is greater than the first threshold X, the included angle is less than or equal to X. The obtaining module 710 may be further configured to generate the first screen-on instruction when detecting that the included angle increases to be greater than X.

In a possible implementation, the obtaining module 710 may be configured to receive a screen-on touch instruction.

In a possible implementation, the obtaining module 710 may be further configured to: after the electronic apparatus lights up the first screen area according to the first screen-on instruction, and sets the second screen area other than the first screen area to be in the screen-off state, generate a second screen-on instruction when detecting that the included angle is greater than Y. The setting module 730 may be further configured to light up the second screen area according to the second screen-on instruction.

In a possible implementation, the obtaining module 710 may be further configured to: after the electronic apparatus lights up the second screen area according to the second screen-on instruction, generate a first screen-off instruction when detecting that the included angle is greater than Z, where Z is greater than Y and less than or equal to 360 degrees. The setting module 730 may be further configured to set, according to the first screen-off instruction, the second screen area to enter the screen-off state.

In a possible implementation, the obtaining module 710 may be further configured to: after the electronic apparatus lights up the second screen area according to the second screen-on instruction, generate a second screen-off instruction when detecting that the included angle decreases from an angle being greater than or equal to Y to an angle being less than W, where W is less than or equal to Y and greater than X. The setting module 730 may be further configured to set, according to the second screen-off instruction, the second screen area to enter the screen-off state.

In a possible implementation, the determining module 720 may be further configured to: if the at least two screen areas correspond to a same rotation speed or a same rotation acceleration, determine the first screen area based on included angles between the at least two screen areas and a gravitational acceleration, or determine the first screen area based on an image collected by using a photographing apparatus on a side of one of the at least two screen areas.

In a possible implementation, the apparatus 700 may be located in an electronic apparatus. In another embodiment of this application, the electronic apparatus may be a terminal or the like.

The apparatus in this embodiment may be configured to execute the technical solutions in the method embodiments shown in FIG. 3A to FIG. 6A-2. An implementation principle and a technical effect of the apparatus are similar to those in the method embodiments, and details are not described herein.

The following describes an electronic apparatus to which the screen-on method provided in this application is applied.

In this application, an included angle between screen areas of the electronic apparatus in the foregoing screen-on method may be obtained through detection by using an angle detection unit disposed in the electronic apparatus. For example, the angle detection unit in the electronic apparatus may be an angle sensor, a distance sensor, a pressure sensing unit, or the like.

Figure 8A:
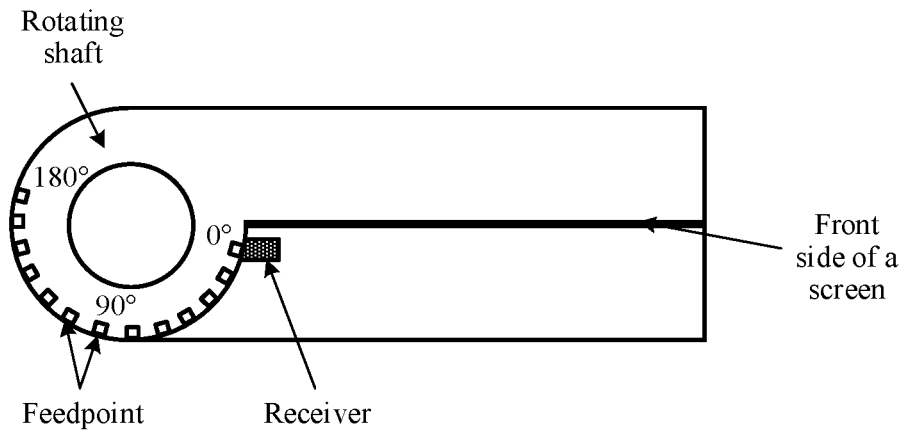
FIG. 8A is a schematic diagram 1 of an electronic apparatus with an angle sensor.
Figure 8B:
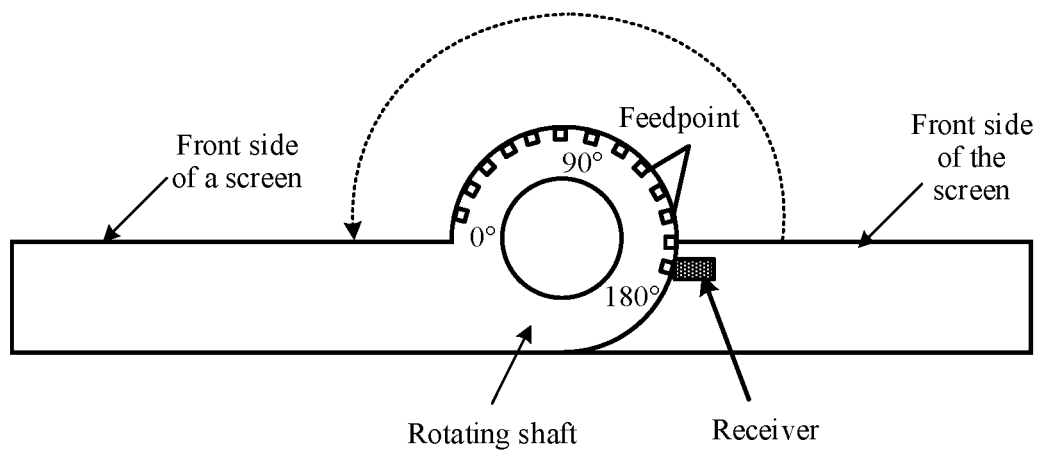
FIG. 8B is a schematic diagram 2 of an electronic apparatus with an angle sensor.
Figure 8C:
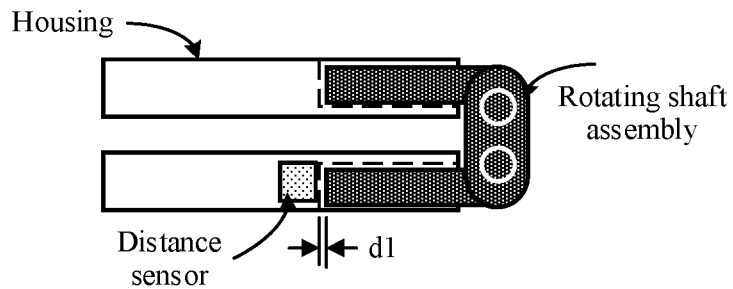
FIG. 8C is a schematic diagram 1 of an electronic apparatus with a distance sensor.
Figure 8D:
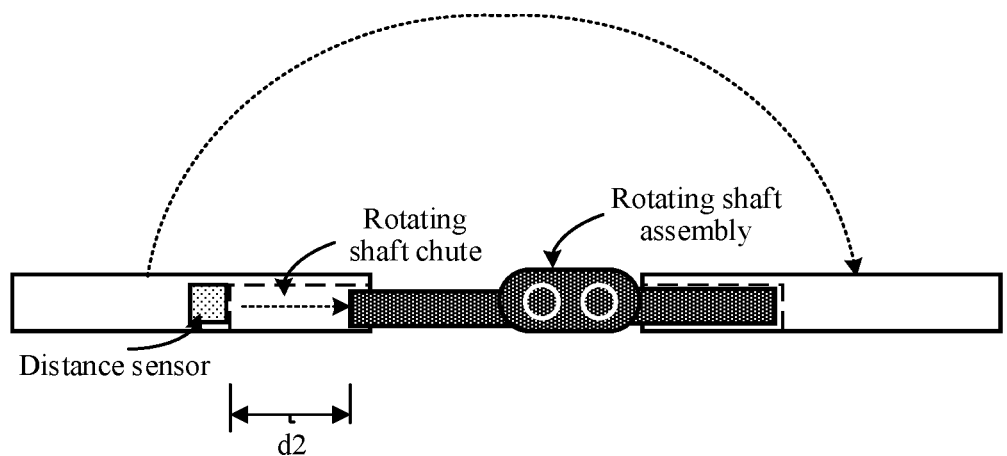
FIG. 8D is a schematic diagram 2 of an electronic apparatus with a distance sensor.
Figure 8E:
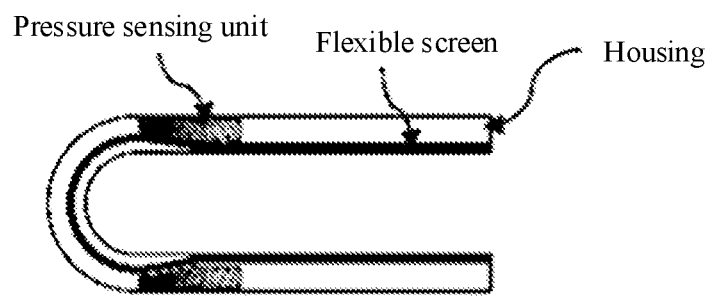
FIG. 8E is a schematic diagram 1 of an electronic apparatus with a pressure sensor.

FIG. 8A is a schematic diagram 1 of an electronic apparatus with an angle sensor, and FIG. 8B is a schematic diagram 2 of an electronic apparatus with an angle sensor. FIG. 8C is a schematic diagram 1 of an electronic apparatus with a distance sensor, and FIG. 8D is a schematic diagram 2 of an electronic apparatus with a distance sensor. FIG. 8E is a schematic diagram 1 of an electronic apparatus with a pressure sensor, and FIG. 8F is a schematic diagram 2 of an electronic apparatus with a pressure sensor.

As shown in FIG. 8A and FIG. 8B, the angle sensor may include a rotating shaft, a feedpoint, and a receiver. The rotating shaft drives the feedpoint to rotate together with a front side of a screen, and each feedpoint represents a specific angle value. When the feedpoint passes through the receiver, the receiver receives information (an angle value) of the feedpoint, and then a processing unit reads the corresponding value.

As shown in FIG. 8C and FIG. 8D, the distance sensor may include a rotating shaft assembly, a rotating shaft chute, and a distance measurement component. The rotating shaft assembly is a double-shaft structure. One end is fastened on a side of a housing, and the other end may slide in the rotating shaft chute in the other side of the housing. The distance measurement component (an infrared or ultrasonic distance measurement component) is disposed at an end of the rotating shaft chute. In a process of expanding a screen in a closed state, a distance between the rotating shaft assembly and the proximity sensor gradually increases. A sliding stroke (d2–d1) may determine a distance unit corresponding to each angle unit based on an equal number of opening and closing angles, to obtain corresponding flip angles through calculation under different sliding distances. For example, when an included angle between screen areas is 180 degrees, the sliding stroke may be d2–d1, or when an angle of an included angle between screen areas is 90 degrees, the sliding stroke may be d3–d1.

Figure 8F:
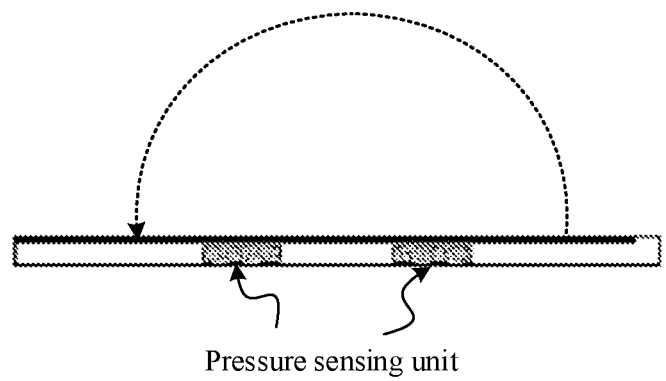
FIG. 8F is a schematic diagram 2 of an electronic apparatus with a pressure sensor.

As shown in FIG. 8E and FIG. 8F, the pressure sensing unit may be disposed on a housing of an electronic apparatus that uses a flexible screen. The flexible screen is elastic, and therefore has different levels of tension at different folding angles. For example, when a screen of the electronic apparatus is in a closed state, tension is the greatest. During a process of expanding the screen, the tension gradually decreases. When the screen is fully flattened, the tension is the smallest (equal to 0). According to this principle, the pressure sensing unit may be disposed below the screen, to detect external tension of the screen, and measure a rotation angle based on a correspondence between different tension and different bending angle values.

The included angle between the screen areas of the electronic apparatus may be obtained by using any one of the foregoing angle detection units. Further, a rotation speed or a rotation acceleration of the screen area can be determined based on a change rate of the included angle in a unit time.

In this application, the rotation speed or the rotation acceleration of the screen area of the electronic apparatus in the foregoing screen-on method may be obtained through detection by using an acceleration sensor disposed in the electronic apparatus.

Figure 9:
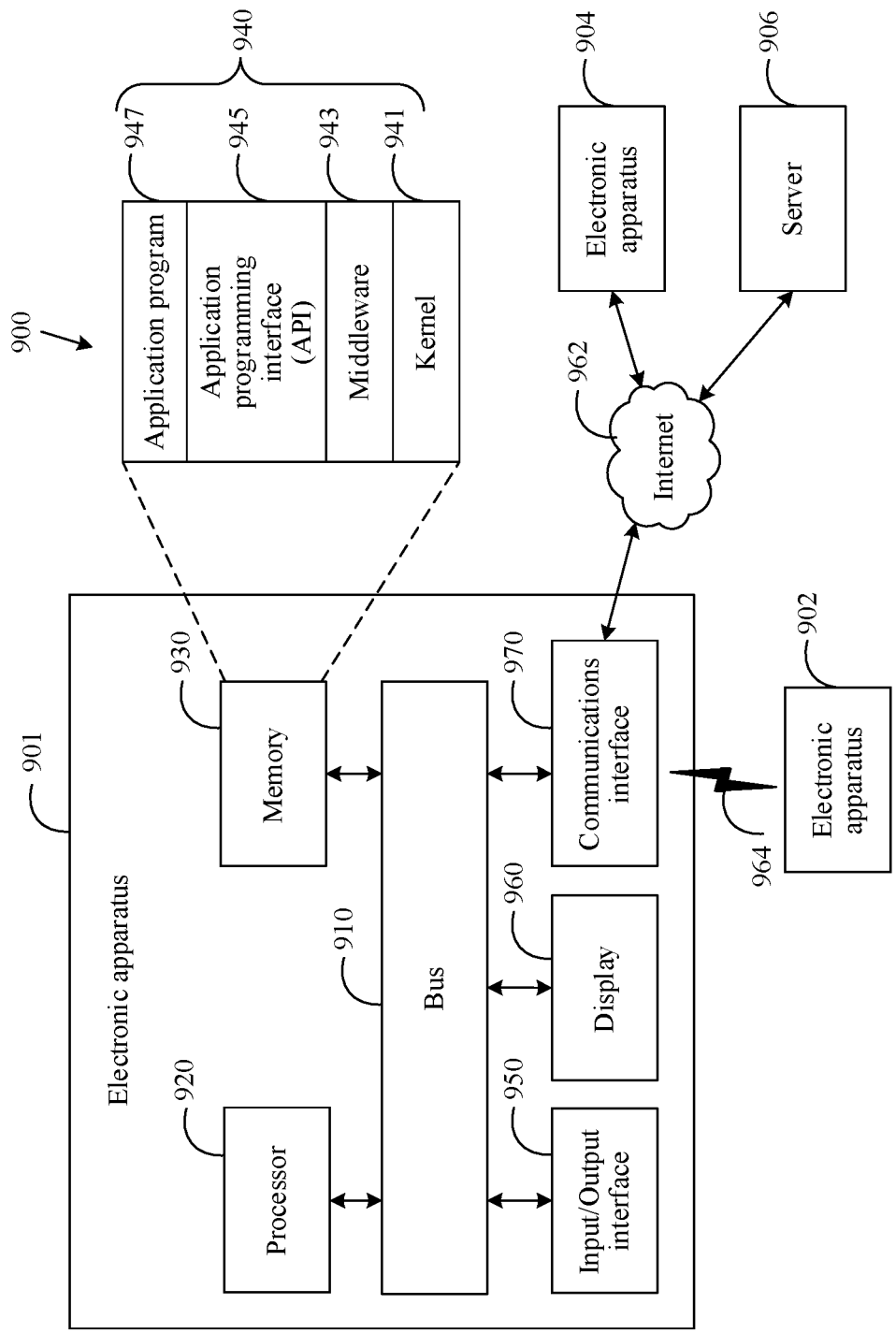
FIG. 9 shows an electronic apparatus in a network environment according to an embodiment of this application.

FIG. 9 shows an electronic apparatus in a network environment according to an embodiment of this application.

With reference to FIG. 9, the following describes an electronic apparatus 901 in a network environment 900 in the embodiments of this application. The electronic apparatus 901 may include a bus 910, a processor 920, a memory 930, an input/output interface 950, a display 960, and a communications interface 970. In the embodiments of this application, at least one of the foregoing elements may be omitted, or another element may be added to the electronic apparatus 901.

The bus 910 may include a circuit for connecting the elements 910, 920, 930, 950, 960, and 970 to each other and transmitting communication (for example, controlling a message and/or data) between the elements.

The processor 920 may include at least one of a central processing unit (CPU), an application processor (AP), or a communications processor (CP). The processor 920 may perform an operation or data processing related to control and/or communication of at least one of the other elements of the electronic apparatus 901.

The memory 930 may include a volatile memory and/or a non-volatile memory, and the memory 930 may store an instruction or data related to at least one of other elements of the electronic apparatus 901. According to the embodiments of this application, the memory 930 may store software and/or a program 940, and the program 940 may include, for example, a kernel 941, middleware 943, an application programming interface (API) 945, and/or an application program 947. At least a part of the kernel 941, the middleware 943, or the API 945 may be referred to as an operating system (OS).

The kernel 941 may control or manage a system resource (for example, the bus 910, the processor 920, or the memory 930) used to perform an operation or a function of another program (for example, the middleware 943, the API 945, or the application program 947). In addition, the kernel 941 may provide an interface, and the interface allows the middleware 943, the API 945, or the application program 947 to access each element of the electronic apparatus 901 to control or manage the system resource.

The middleware 943 may be used as an intermediary that enables the API 945 or the application program 947 to communicate and exchange data with the kernel 941.

In addition, the middleware 943 may process one or more task requests received from the application program 947 in a priority order. For example, the middleware 943 may allocate a priority of using the system resource (for example, the bus 910, the processor 920, or the memory 930) of the electronic apparatus 901 for at least one application program 947. For example, the middleware 943 may process the one or more task requests based on the priority allocated for the at least one application program, to perform scheduling or load balancing for the one or more task requests.

The API 945 is used as an interface for allowing the application program 947 to control a function provided by the kernel 941 or the middleware 943, and may include at least one interface or function (for example, an instruction) for file control, window control, image processing, character control, or the like.

The input/output interface 950 may be configured to transmit an instruction or data input from a user or another external apparatus to another element of the electronic apparatus 901. In addition, the input/output interface 950 may output, to the user or the another external apparatus, the instruction or the data received from the another element of the electronic apparatus 901.

The display 960 may include, for example, a liquid crystal display (LCD), a light emitting diode (LED) display, an organic light emitting diode (OLED) display, a micro-electro-mechanical system (MEMS) display, or an electronic paper display. The display 960 may present various content (for example, text, images, videos, icons, symbols, or similar objects) to the user. The display 960 may include a touchscreen, and may receive a touch, a gesture, proximity, or hover input from an electronic pen or a part of a body of the user.

The communications interface 970 may establish communication between the electronic apparatus 901 and an external apparatus (for example, a first external electronic apparatus 902, a second external electronic apparatus 904, or a server 906). For example, the communications interface 970 may be connected to a network (e.g., Internet) 962 through wireless communication or wired communication, to communicate with the external apparatus (for example, the second external electronic apparatus 904 or the server 906). At least one of cellular communications protocols, such as long term evolution (LTE), long term evolution-advanced (LTE-A), code division multiple access (CDMA), wideband code division multiple access (WCDMA), universal mobile telecommunications system (UMTS), wireless broadband (WiBro), or global system for mobile communications (GSM) may be used for the wireless communication. The wireless communication may include, for example, short range communication 964. The short range communication may include at least one of wireless fidelity (Wi-Fi), Bluetooth, near field communication (NFC), magnetic stripe transmission (MST), or Global Navigation Satellite System (GNSS).

Figure 10:
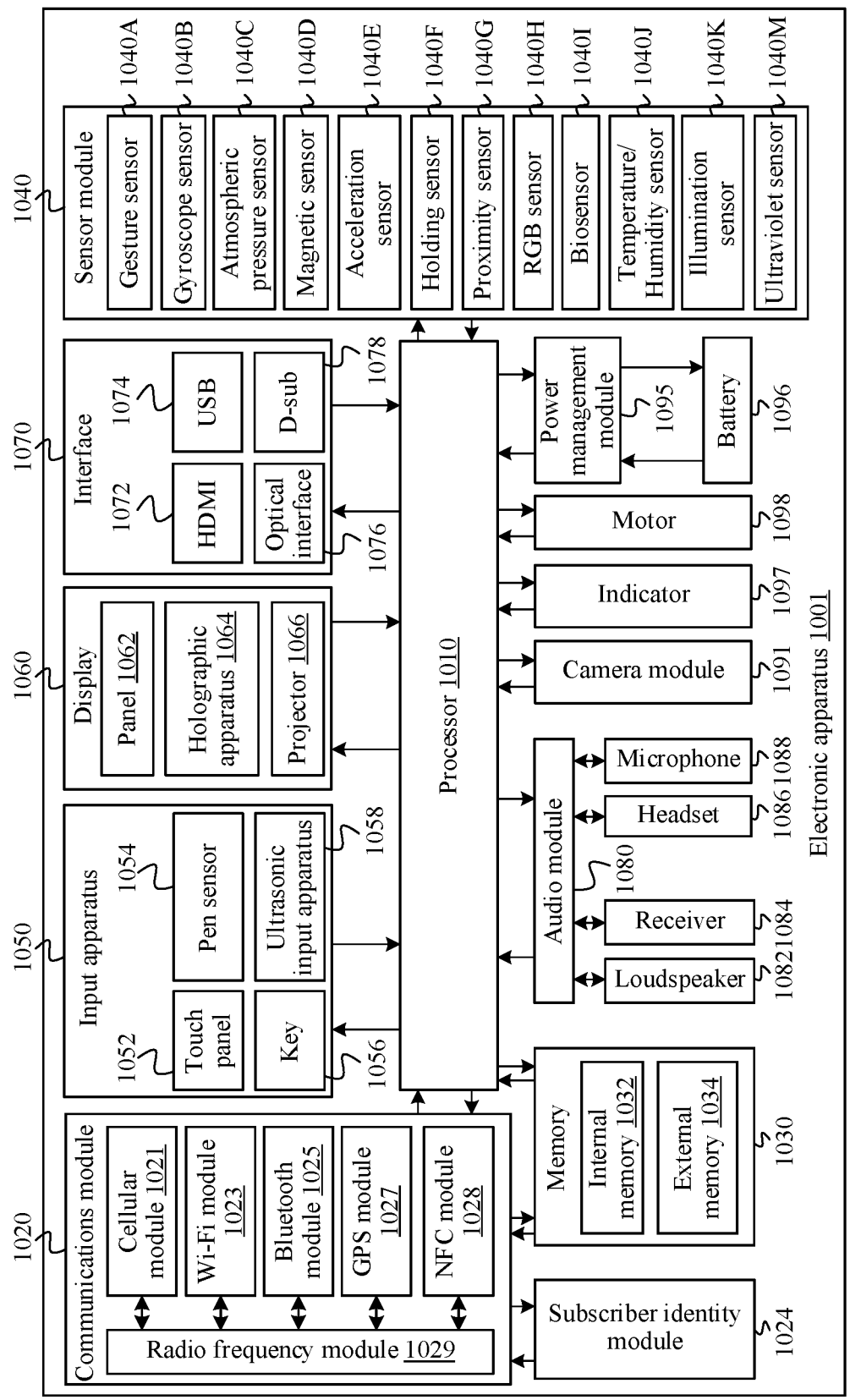
FIG. 10 is a system diagram of an electronic apparatus according to this application.

FIG. 10 is a system diagram of an electronic apparatus according to this application. As shown in FIG. 10, an electronic apparatus 1001 to which the foregoing method is applied may include, for example, a part or all of the electronic apparatus 901 shown in the system diagram. The electronic apparatus 1001 may include at least one processor (for example, an AP) 1010, a communications module 1020, a subscriber identity module (SIM) 1024, a memory 1030, a sensor module 1040, an input apparatus 1050, a display 1060, an interface 1070, an audio module 1080, a camera module 1091, a power management module 1095, a battery 1096, an indicator 1097, and a motor 1098.

The processor 1010 may run an operating system or an application program to control a plurality of hardware or software elements connected to the processor 1010, and may process various data and perform an operation, and the processor 1010 may be implemented as, for example, a system on chip (SoC). According to this embodiment of this application, the processor 1010 may further include a graphics processing unit (GPU) and/or an image signal processor, and the processor 1010 may include at least some of the elements shown in FIG. 10 (for example, a cellular module 1021). The processor 1010 may load an instruction or data received from at least one of other elements (for example, a non-volatile memory) onto a volatile memory to process the instruction or the data, and may store various data in the non-volatile memory.

The communications module 1020 may have a same or similar configuration as the communications interface 970 in FIG. 9, and the communications module 1020 may include, for example, the cellular module 1021, a Wi-Fi module 1023, a Bluetooth (BT) module 1025, a Global Positioning System (GPS) module 1027, an NFC module 1028, and a radio frequency (RF) module 1029.

The cellular module 1021 may provide, for example, a voice call service, a video call service, a text message service, or an internet service by using a communications network, and the subscriber identity module 1024 (for example, a SIM card) may be used for the cellular module 1021 to identify and verify the electronic apparatus 1001 in the communications network. The cellular module 1021 may perform at least some of functions that may be provided by the processor 1010, and the cellular module 1021 may include a communications processor (CP).

Each of the Wi-Fi module 1023, the Bluetooth module 1025, the GPS module 1027, and the NFC module 1028 may include, for example, a processor configured to process data sent/received by using these modules. According to some different embodiments of this application, at least some (for example, two or more) of the cellular module 1021, the Wi-Fi module 1023, the Bluetooth module 1025, the GPS module 1027, and the NFC module 1028 may be included in a single integrated circuit (IC) chip or IC package.

The RF module 1029 may, for example, send/receive a communications signal (for example, an RF signal), and the RF module 1029 may include, for example, a transceiver, a power amplifier module (PAM), a frequency filter, a low noise amplifier (LNA), and an antenna. According to another embodiment of this application, at least one of the cellular module 1021, the Wi-Fi module 1023, the Bluetooth module 1025, the GPS module 1027, or the NFC module 1028 may send/receive the RF signal by using a separate RF module. The SIM 1024 may include, for example, a card including the subscriber identity module and/or an embedded SIM, and may include unique identification information (for example, an integrated circuit card identity (ICCID)) or user information (for example, an international mobile subscriber identity (IMSI)).

The memory 1030 (for example, the memory 930) may include, for example, an internal memory 1032 or an external memory 1034. The internal memory 1032 may include at least one of the following: a volatile memory (for example, a dynamic random access memory (DRAM), a static random access memory (SRAM), or a synchronous dynamic random access memory (SDRAM)), or a non-volatile memory (for example, a one time programmable read-only memory (OTPROM), a programmable read-only memory (PROM), an erasable programmable read-only memory (EPROM), an electrically erasable programmable read-only memory (EEPROM), a mask read-only memory, a flash read-only memory, a flash memory (for example, a NAND flash memory or a NOR flash memory), a hard disk drive, or a solid-state drive (SSD)).

The external memory 1034 may include a flash memory drive, for example, a compact flash (CF), a secure digital (SD) card, a micro SD, a mini SD, a fast card (xD), a multimedia card (MMC), or a memory stick. The external memory 1034 may be operably and/or physically connected to the electronic apparatus 1001 through various interfaces.

For example, the sensor module 1040 may measure a physical quantity or detect an operating state of the electronic apparatus 1001, to convert measured or detected information into an electrical signal. For example, the sensor module 1040 may include at least one of a gesture sensor 1040A, a gyroscope sensor 1040B, an atmospheric pressure sensor 1040C, a magnetic sensor 1040D, an acceleration sensor 1040E, a holding sensor 1040F, a proximity sensor 1040G, and a color sensor 1040H (for example, a red/green/blue (RGB) sensor), a biosensor 1040I, a temperature/humidity sensor 1040J, an illumination sensor 1040K, or an ultraviolet (UV) sensor 1040M. Additionally or alternatively, the sensor module 1040 may include, for example, an olfaction sensor (an electronic nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit configured to control at least one sensor included in the sensor module 1040. In some different embodiments of this application, the electronic apparatus 1001 may further include a processor, and the processor is used as a part of the processor 1010 or separately controls the sensor module 1040, to control the sensor module 1040 when the processor 1010 is in a sleep state.

The input apparatus 1050 may include, for example, a touch panel 1052, a (digital) pen sensor 1054, a key 1056, or an ultrasonic input apparatus 1058. At least one of a capacitive sensing method, a resistive sensing method, an infrared sensing method, and an ultrasonic sensing method may be used for the touch panel 1052. The touch panel 1052 may further include a control circuit, and the touch panel 1052 may further include a tactile layer, to provide a tactile feedback to the user.

The (digital) pen sensor 1054 may include, for example, an identity plate that is used as a part of the touch panel or that is separate. The key 1056 may include, for example, a physical button, an optical button, or a keyboard. The ultrasonic input apparatus 1058 may sense an ultrasonic wave generated by an input tool by using a microphone 1088 to identify data corresponding to the sensed ultrasonic wave.

The display 1060 (for example, the display 960) may include a panel 1062, a holographic apparatus 1064, or a projector 1066. The panel 1062 may have the same or similar structure as the display 960 of FIG. 9, and the panel 1062 may be, for example, flexible, transparent, or wearable. The panel 1062 and the touch panel 1052 may be integrated into a single module. The holographic apparatus 1064 may display a stereoscopic image in space by using a light interference phenomenon. The projector 1066 may project light onto a screen for displaying an image. According to this embodiment of this application, the display 1060 may further include a control circuit configured to control the panel 1062, the holographic apparatus 1064, or the projector 1066.

The interface 1070 may include, for example, an HDMI 1072, a USB 1074, an optical interface 1076, or a D-sub 1078. For example, the interface 1070 may be included in the communications interface 970 shown in FIG. 9. Additionally or alternatively, the interface 1070 may include, for example, a mobile high-definition link (MHL) interface, an SD card/multimedia card (MMC) interface, or an infrared data association (IrDA) interface.

For example, the audio module 1080 may convert a sound into an electrical signal, or may convert an electrical signal into a sound. At least some of elements of the audio module 1080 may be included in the input/output interface 950 shown in FIG. 9. The audio module 1080 may process sound information that is input or output by using a loudspeaker 1082, a receiver 1084, a headset 1086, or the microphone 1088.

For example, the camera module 1091 is an apparatus configured to photograph a still image or a video. According to this embodiment of this application, the camera module 1091 may include at least one image sensor (for example, a front sensor or a rear sensor), a lens, an image signal processor (ISP), or a flash-lamp (for example, an LED lamp or a xenon lamp).

The power management module 1095 may manage a power supply of the electronic apparatus 1001. According to this embodiment of this application, the power management module 1095 may include a power management integrated circuit (PMIC), a charger integrated circuit (IC), or a battery meter. Wired and/or wireless charging methods/method may be used for the PMIC. For example, the wireless charging method may include a magnetic resonance method, a magnetic induction method, an electromagnetic method, or the like. An additional circuit (for example, a coil circuit, a resonant circuit, or a rectifier) for wireless charging may be further included. The battery meter may measure, for example, a remaining capacity of the battery 1096 and a voltage, a current, or a temperature of the battery during charging. The battery 1096 may include, for example, a rechargeable battery and/or a solar battery.

The indicator 1097 may display a specific state of the electronic apparatus 1001 or a component (for example, the processor 1010) of the electronic apparatus 1001, for example, a startup state, a message state, or a charging state. The motor 1098 may convert an electrical signal into a mechanical vibration, and may generate a vibration or a tactile effect. Although not shown, the electronic apparatus 1001 may include a processing apparatus (for example, the GPU) configured to support mobile television. The processing apparatus configured to support mobile television may process media data according to a standard such as digital multimedia broadcasting (DMB), digital video broadcasting (DVB), or MediaFLO™.

Each element described herein may be configured with one or more components, and a name of the element may be changed based on a type of the electronic apparatus. In the embodiments of this application, the electronic apparatus may include at least one of the elements described herein, and some elements may be omitted or another additional element may be added. In addition, the some elements of the electronic apparatus may be combined into one entity, so that functions of the elements may be performed in the same manner as before combination.

Figure 11:
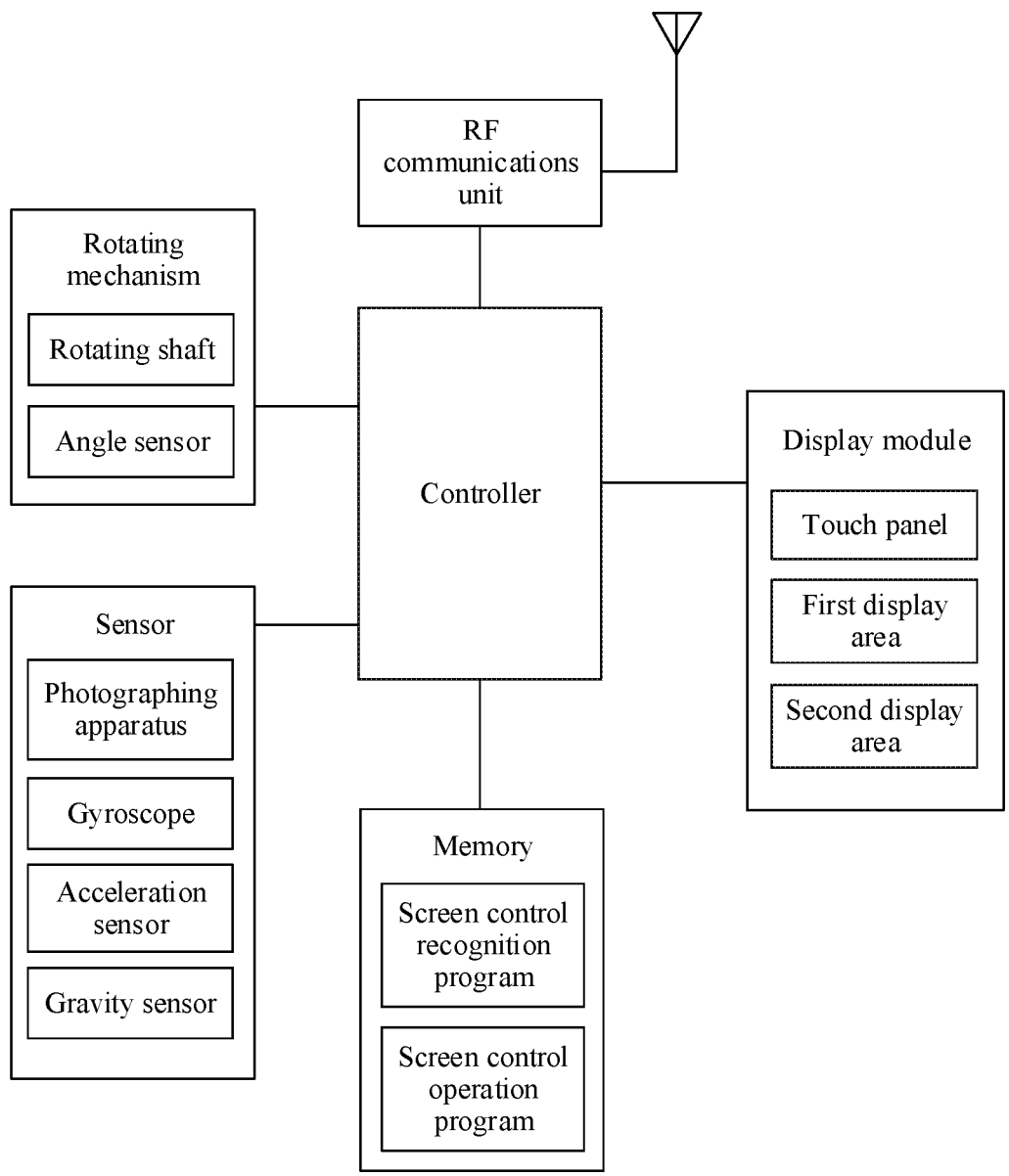
FIG. 11 is a schematic diagram of a core structure of an electronic apparatus according to this application.

The following provides a description by using a core structure of an electronic apparatus to which the screen-on method provided in this application is applied as an example. FIG. 11 is a schematic structural diagram of a core structure of an electronic apparatus according to this application. As shown in FIG. 11, the electronic apparatus includes a rotating mechanism, a sensor, a memory, a display module, a radio frequency (RF) communications unit, and a controller. The rotating mechanism may include a rotating shaft and an angle sensor. The rotating shaft is configured to flip and rotate a folded screen, and the angle sensor may be configured to detect an included angle between screen areas. The display module may be configured to display a user interface (UI) of a user operation interface. The display module may divide a complete screen area into a first display area and a second display area, and may control the first display area and the second display area to perform partition display or overall display. In addition, whether to perform partition display or overall display may alternatively be determined based on different angles of included angles between the screen areas. The sensor may be configured to identify an input condition for controlling a first screen area, and the first screen area is a main screen facing a user. The sensor may include a dual/single photographing apparatus (e.g., a camera), a gyroscope, an acceleration sensor (G-sensor), and a gravity sensor. The memory may include a screen control recognition program and a screen control operation program that are respectively configured to store control conditions of the first display area and the second display area and execute corresponding instructions. The electronic apparatus provided in this embodiment of this application may be configured to perform the screen-on method in the foregoing embodiments.

This application further provides a terminal. The terminal may include a display and a processor, and the processor may be configured to perform the steps that are related to the electronic apparatus and that are in the screen-on method embodiments shown in the foregoing accompanying drawings.

This application further provides a computer-readable storage medium. The computer-readable storage medium stores an instruction, and when the instruction is run on a computer, the steps that are related to the electronic apparatus and that are in the method embodiment shown in any one of the foregoing accompanying drawings are performed.

This application provides a computer program. When the computer program is executed by a computer, the steps that are related to the electronic apparatus and that are in the method embodiments shown in the foregoing accompanying drawings are performed.

All or some of the foregoing embodiments may be implemented by using software, hardware, firmware, or any combination thereof. When software is used to implement the embodiments, the embodiments may be implemented in a form of a computer program product. The computer program product includes one or more computer program instructions. When the computer program instructions are loaded and executed on the computer, the procedure or the functions according to this application are all or partially generated. The computer may be a general-purpose computer, a special-purpose computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

What is claimed is:
1. A method comprising:
  in a screen-off state, obtaining, by an electronic apparatus, a first screen-on instruction, wherein a screen of the electronic apparatus is divided into at least two screen areas by a bending axis;

determining, by the electronic apparatus, a first screen area among the at least two screen areas based on at least one of rotation speeds or rotation accelerations performed by a user at which the at least two screen areas rotate around the bending axis, wherein the determining comprises:
- obtaining, by the electronic apparatus, the rotation speeds or the rotation accelerations corresponding to the at least two screen areas; and
- determining, by the electronic apparatus and based on the obtained rotation speeds or rotation accelerations, a screen area with a smallest rotation speed or a smallest rotation acceleration as the first screen area;

in response to determining that the at least two screen areas correspond to a same rotation speed or a same rotation acceleration, determining the first screen area based on at least one of included angles between the at least two screen areas and a gravitational acceleration or an image collected by a photographing apparatus on a side of one of the at least two screen areas; and in response to determining the first screen area of the at least two screen areas, lighting up, by the electronic apparatus, the first screen area according to the first screen-on instruction, and setting a second screen area other than the first screen area to be in the screen-off state.

2. The method according to claim 1, wherein the obtaining, by an electronic apparatus, a first screen-on instruction comprises:
- generating, by the electronic apparatus, the first screen-on instruction in response to detecting that an included angle between the at least two screen areas is greater than a first threshold X and less than a second threshold Y,
- wherein X is greater than or equal to 0 degree, and Y is less than or equal to 180 degrees.

3. The method according to claim 2, wherein before the generating, by the electronic apparatus, the first screen-on instruction in response to detecting that an included angle between the at least two screen areas is greater than a first threshold X, the included angle is less than or equal to X; and
- wherein the generating, by the electronic apparatus, the first screen-on instruction in response to detecting that an included angle between the at least two screen areas is greater than a first threshold X comprises:
  - generating, by the electronic apparatus, the first screen-on instruction in response to detecting that the included angle increases to be greater than X.

4. The method according to claim 2, wherein before the generating, by the electronic apparatus, the first screen-on instruction in response to detecting that an included angle between the at least two screen areas is greater than a first threshold X and less than a second threshold Y, the method further comprises:
- receiving, by the electronic apparatus, a screen-on touch instruction.

5. The method according to claim 2, wherein after the lighting up, by the electronic apparatus, the first screen area according to the first screen-on instruction, and setting a second screen area other than the first screen area to be in the screen-off state, the method further comprises:
- generating, by the electronic apparatus, a second screen-on instruction in response to detecting that the included angle is greater than Y; and
- lighting up, by the electronic apparatus, the second screen area according to the second screen-on instruction.

6. The method according to claim 5, wherein after the lighting up, by the electronic apparatus, the second screen area according to the second screen-on instruction, the method further comprises:
- generating, by the electronic apparatus, a first screen-off instruction in response to detecting that the included angle is greater than Z, wherein Z is greater than Y and less than or equal to 360 degrees; and
- setting, by the electronic apparatus according to the first screen-off instruction, the second screen area to enter the screen-off state.

7. The method according to claim 6, wherein Y is greater than or equal to 90 degrees, and Z is greater than or equal to 180 degrees.

8. The method according to claim 5, wherein after the lighting up, by the electronic apparatus, the second screen area according to the second screen-on instruction, the method further comprises:
- generating, by the electronic apparatus, a second screen-off instruction in response to detecting that the included angle decreases from an angle being greater than or equal to Y to an angle being less than W, wherein W is less than or equal to Y and greater than X; and
- setting, by the electronic apparatus according to the second screen-off instruction, the second screen area to enter the screen-off state.

9. A terminal comprising:
a display;
at least one processor; and
one or more memories coupled to the at least one processor and storing programming instructions for execution by the at least one processor, the programming instructions instructing the at least one processor to perform operations comprising:
- in a screen-off state, obtaining a first screen-on instruction, wherein a screen of the display is divided into at least two screen areas by a bending axis;
- determining a first screen area among the at least two screen areas based on at least one of rotation speeds or rotation accelerations performed by a user at which the at least two screen areas rotate around the bending axis, wherein the determining comprises:
  - obtaining the rotation speeds or the rotation accelerations corresponding to the at least two screen areas; and
  - determining, based on the obtained rotation speeds or rotation accelerations, a screen area with a smallest rotation speed or a smallest rotation acceleration as the first screen area;
- in response to determining that the at least two screen areas correspond to a same rotation speed or a same rotation acceleration, determining the first screen area based on at least one of included angles between the at least two screen areas and a gravitational acceleration or an image collected by a photographing apparatus on a side of one of the at least two screen areas; and
- in response to determining the first screen area of the at least two screen areas, lighting up the first screen area according to the first screen-on instruction, and setting a second screen area other than the first screen area to be in the screen-off state.

10. The terminal according to claim 9, wherein the obtaining a first screen-on instruction comprises:

generating the first screen-on instruction in response to detecting that an included angle between the at least two screen areas is greater than a first threshold X and less than a second threshold Y,
wherein X is greater than or equal to 0 degrees, and Y is less than or equal to 180 degrees.

11. The terminal according to claim 10, wherein:
before the generating the first screen-on instruction in response to detecting that an included angle between the at least two screen areas is greater than a first threshold X, the included angle is less than or equal to X; and
the generating the first screen-on instruction in response to detecting that an included angle between the at least two screen areas is greater than a first threshold X comprises:
generating the first screen-on instruction in response to detecting that the included angle increases to be greater than X.

12. The terminal according to claim 10, wherein before the generating the first screen-on instruction in response to detecting that an included angle between the at least two screen areas is greater than a first threshold X and less than a second threshold Y, the operations further comprise:
receiving a screen-on touch instruction.

13. The terminal according to claim 10, wherein after the lighting up the first screen area according to the first screen-on instruction, and setting a second screen area other than the first screen area to be in the screen-off state, the operations further comprise:
generating a second screen-on instruction in response to detecting that the included angle is greater than Y; and
lighting up the second screen area according to the second screen-on instruction.

14. The terminal according to claim 13, wherein after the lighting up the second screen area according to the second screen-on instruction, the operations further comprise:
generating a first screen-off instruction in response to detecting that the included angle is greater than Z, wherein Z is greater than Y and less than or equal to 360 degrees; and
setting, according to the first screen-off instruction, the second screen area to enter the screen-off state.

15. The terminal according to claim 14, wherein Y is greater than or equal to 90 degrees, and Z is greater than or equal to 180 degrees.

16. The terminal according to claim 13, wherein after the lighting up the second screen area according to the second screen-on instruction, the operations further comprise:
generating a second screen-off instruction in response to detecting that the included angle decreases from an angle being greater than or equal to Y to an angle being less than W, wherein W is less than or equal to Y and greater than X; and
setting, according to the second screen-off instruction, the second screen area to enter the screen-off state.

* * * * *